(12) United States Patent
Kaufman et al.

(10) Patent No.: US 6,591,407 B1
(45) Date of Patent: Jul. 8, 2003

(54) METHOD AND APPARATUS FOR INTERCONNECT-DRIVEN OPTIMIZATION OF INTEGRATED CIRCUIT DESIGN

(75) Inventors: Douglas Kaufman, Menlo Park, CA (US); Hazem Almusa, San Jose, CA (US); Vinay Srinivas, Redwood City, CA (US); Donald V. Organ, Saratoga, CA (US); Larry Ke, San Jose, CA (US); Wei Li, Milpitas, CA (US); Japinder Singh, Santa Clara, CA (US); Robert Mathews, Los Altos, CA (US)

(73) Assignee: Sequence Design, Inc., Santa Clara, CA (US)

( * ) Notice: Subject to any disclaimer, the term of this patent is extended or adjusted under 35 U.S.C. 154(b) by 0 days.

(21) Appl. No.: 09/516,489

(22) Filed: Mar. 1, 2000

(51) Int. Cl.⁷ .............................................. G06F 17/50
(52) U.S. Cl. ............................... 716/10; 716/2; 716/3; 716/9
(58) Field of Search ............................... 716/2, 3, 10, 9

(56) References Cited

U.S. PATENT DOCUMENTS

| | | | | |
|---|---|---|---|---|
| 5,629,859 A | * | 5/1997 | Agarwala et al. | 716/6 |
| 5,663,662 A | * | 9/1997 | Kurosawa | 326/41 |
| 5,726,903 A | * | 3/1998 | Kerzman et al. | 716/2 |
| 5,901,063 A | * | 5/1999 | Chang et al. | 716/4 |
| 5,923,564 A | * | 7/1999 | Jones, Jr. | 716/6 |
| 5,984,510 A | * | 11/1999 | Guruswamy et al. | 716/2 |
| 6,058,252 A | * | 5/2000 | Noll et al. | 716/10 |
| 6,145,117 A | * | 11/2000 | Eng | 716/18 |
| 6,263,478 B1 | * | 7/2001 | Hahn et al. | 716/10 |
| 6,360,356 B1 | * | 3/2002 | Eng | 716/18 |
| 6,381,730 B1 | * | 4/2002 | Chang et al. | 716/5 |
| 6,470,486 B1 | * | 10/2002 | Knapp | 716/18 |

OTHER PUBLICATIONS

NN950127 ("Algorithm for Incremental Timing Analysis", IBM Technical Disclosure Bulletin, vol. 38, No. 1, Jan. 1995, pp. 27–34 (18 pages).*

* cited by examiner

*Primary Examiner*—Matthew Smith
*Assistant Examiner*—Phallaka Kik
(74) *Attorney, Agent, or Firm*—Edward C. Kwok; MacPherson Kwok Chen & Heid LLP

(57) ABSTRACT

A method and an apparatus are provided for post-layout optimization of an integrated circuit. In one instance, only local transformations accomplished by incremental changes to placement and routing are provided, so as to avoid the costly design iteration loop that requires re-synthesis, re-place and re-route. Optimization can be provided in multiple optimization phases each accomplishing a specified set of transformations. Static timing analysis is performed at the end of each set of local transformations to determine if further optimization steps are required. In one instance, the physical design is first scanned for mismatch between drivers and loads. Then, in a second optimization phase, "hot spots" in the physical design are identified for local transformation using a "bidirectional combinational total negative slack" (BCTNS) algorithm. In subsequent phases, optimization based on meeting setup times and hold times in a critical path are performed.

60 Claims, 36 Drawing Sheets

METHOD AND APPARATUS FOR INTERCONNECT-DRIVEN OPTIMIZATION OF INTEGRATED CIRCUIT DESIGN

BACKGROUND OF THE INVENTION

1. Field of the Invention

The present invention relates to a tool for integrated circuit design. In particular, the present invention relates to a tool for optimizing the physical design of a standard cell-based integrated circuit for performance.

2. Discussion of the Related Art

A standard cell-based integrated circuit is designed using a library of building blocks, known as "standard cells." Standard cells include such elements as buffers, logic gates, registers, multiplexers, and other logic circuits ("Macros").

FIG. 1a shows a typical design process or "flow" 100 that an integrated circuit designer would use to design a standard cell-based integrated circuit. As shown in FIG. 1a, at step 101, the designer provides a functional or behavioral description of the integrated circuit using a hardware description language. In addition, the designer specifies timing and other performance constraints (109) with which the integrated circuit must comply. Then, at step 102, the designer selects a standard cell library to implement the design. Typically, the standard cells in the library are designed to the requirements of a target manufacturing technology. Often, each cell is also characterized to provide performance parametric values such as delay, input capacitance and output drive strength.

At step 103, the designer uses a "synthesis tool" to create from the functional or behavioral description a functionally equivalent logic gate-level circuit description known as a "netlist." The elements of the netlist are instances of standard cells selected by the synthesis tool from the standard cell library in accordance with functional requirements and the performance constraints. At this stage, the synthesis tool uses the characteristic parametric values of each standard cell and a model of input and output loads ("wire load model" or "WLM") to attempt to meet performance requirements.

At step 104, a "place and route" tool creates a "physical design" by placing the standard cell instances of the netlist onto the "silicon real estate" and routes conductor traces ("wires") among these standard cell instances to provide for interconnection. Typically, the placement and routing of these standard cell instances are guided by cost functions, which minimize wiring lengths and the area requirements of the resulting integrated circuit.

At step 105, with the wires of the integrated circuit having been routed at step 104, a more accurate set of parasitic impedance values in the wires can be extracted. Using the extracted parasitic impedance values, a more accurate timing analysis can be run at step 106 using a static timing analyzer (STA). If the physical design meets timing constraints, the design process is complete (step 108). Otherwise, steps 103–106 are repeated after appropriate modifications at step 107 are made to the netlist and the performance constraints.

Design process 100 suffers from a number of disadvantages. First, WLM is a crude model based on statistics. Because of the inaccurate model, a designer typically uses an "$80^{th}$ percentile WLM" (i.e., 80% of the nets will have a capacitance less than predicted by the WLM). As a result, the drivers for many nets are unnecessarily large, while other driver are too weak. Additionally, designers tend to provide 30% or more additional safety margins to accommodate other inaccuracies in the design flow. Such over-design represents inefficiencies in both silicon area and performance. Second, under this typical method, whenever a non-trivial modification is made to the design to meet a performance requirement, the design is re-synthesised, re-placed and re-routed, which are very time-consuming and costly steps, even when timing is met in a majority of nets. Typically, at each iteration, the physical design undergoes major changes that may introduce new sub-optimal nets requiring another iteration of synthesis, placement and routing to correct.

The inefficiency in the prior art method results in both high cost and long development time in engineering, time-to-market and manufacturing.

SUMMARY

The present invention provides methods and systems for optimizing a post-layout design without requiring re-synthesis. In these methods and systems, accurately extracted timing information from the physical design drives transformation of the physical design, thereby avoiding the inaccuracy of wire load models of the prior art. Further, methods and systems of the present invention apply local transformations to the physical design, thereby maintaining substantial integrity (i.e., validity and accuracy) in the interconnect models during the transformation process. Accurate models of parasitic impedance can be obtained using an asymptotic waveform evaluation technique.

According to one embodiment of the present invention, one method for post-layout optimization of an integrated circuit includes: (a) providing a logic description of the integrated circuit; (b) synthesizing from the logic description a netlist of the integrated circuit using instances of cells from a standard cell design library; (c) placing and routing the instances to provide a physical design of the integrated circuit; (d) extracting from the physical design models of parasitic impedance of interconnect in the physical design; and (e) optimizing the physical design by modifying the physical design according to the models of parasitic impedance. Under that method, in one embodiment, the optimization iteratively (a) identifies, using a static timing analyzer, locations in the physical design where timing violations occur and (b) applies one or more local transformations to the physical design to correct the timing violation.

In one implementation, the method performs a forward sweep and a backward sweep of the physical design to compute a required signal arrival time and a latest signal arrival time, respectively.

In accordance with another aspect of the present invention, a library analysis step provides characterization of the standard cell library to allows accurate timing and load driving ability analyses. In particular, one method enables a cell to be selected from a library to perform a given logic function and to drive a given load capacitance. That method includes: (a) dividing the cells in the library into groups, such that cells within each of the groups perform substantially the same logic function; (b) within each group, assigning to selected cells each an operating range of loads; and (c) selecting a cell by matching the logic function and the given load capacitance to the operating range of the cell. In one implementation, the operating range of loads to a cell in the library are assigned according to a metric relating an area of the cell to a delay of the cell. In one implementation, each group contains not only cells performing the given function, but also combinations of such cells and buffers of appropriate drive strengths, and combinations of cells providing a complementary logic function and inverters.

According to another aspect of the present invention, a method of the present invention includes: (a) extracting from the physical design parasitic models of interconnect in the physical design; and (b) applying optimization steps, each optimization step transforming the physical design to achieve a desired performance based on area or delay. In one embodiment, the optimization steps are applied in order of potential intrusiveness to the physical design. Thus, the present invention allows the less complex modifications to be accomplished first. Typically, a large portion of the potential optimization can be achieved by these minimally intrusive modifications to the physical design, leaving the physical design to be substantially optimized even before the more intrusive optimization steps are applied.

In one implementation, an initial optimization step identifies in the physical design a cell instance mismatched to an output load driven by the cell instance; and replaces the cell instance by a second cell instance matched to the output load. Then, a second optimization step computes a potential improvement in slack for each cell instance in the physical design, selects from the physical design cell instances having the largest potential improvements in slack, and applies transformations to the selected cell instances.

In that second optimization step, a bidirectional combinational total negative slack (BCTNS) ranking method of the present invention is used. The BTCNS ranking method identifies "hot spots" in the physical design, which are locations where performance improvements with the highest potential impact. The BTCNS method includes: (a) performing a forward sweep and a backward sweep of the physical design to provide for each cell instance a forward priority value and a backward priority value; (b) calculating an equivalent priority value based on the forward priority value and the backward priority value; and (c) ranking cell instances in the physical design according to the equivalent priority value.

Following the second step of optimization, a third optimization according to a metric based on a path-based algorithm (e.g., a critical path algorithm). The path-based optimization can be used to correct hold and set-up time violations. In that method, the last optimization step identifies in the physical design a cell instance meeting timing requirements but mismatched to an output load driven by the cell instance, and replaces the cell instance by a second cell instance matching the output load and having a smaller silicon area.

In one implementation, the method of the present invention takes advantage of a static timing analyzer capable of performing incremental timing analysis, and an extraction tool capable of performing incremental extraction of parasitic impedance in the interconnect.

The local transformations in the present invention include cell instance upsizing, cell instance downsizing, node off-loading, input swapping and logic duplication.

In one embodiment of the present invention, a system for post-layout design optimization, includes: (a) a library interface for access to a standard cell library; (b) a timing analyzer interface for accessing a static timing analyzer; (c) a design tool interface for accessing a place and route design tool; (d) a design database for storing a physical design of an integrated circuit composed of instances of standard cells from the standard cell library. The system provides routines for traversing the instances in accordance with predetermined orders, a control program for obtaining timing information of the instances from the static timing analyzer, a control program for applying local transformations of the instances guided by the timing information.

The present invention is better understood upon consideration of the detailed description below and the accompanying drawings.

BRIEF DESCRIPTION OF THE DRAWINGS

FIG. 10 is a flow diagram 1000 showing the operations of BCTNS sort step 904 of FIG. 9a.

FIG. 12b shows a backward column PV table initialization step 1200, used in output pin initialization step 1253 of FIG. 12a.

FIG. 14b shows a forward column PV table initialization step 1400, used in input pin initialization step 1453 of FIG. 14a.

DETAILED DESCRIPTION OF THE PREFERRED EMBODIMENTS

The present invention provides a design tool and a method for optimizing a standard-cell based integrated circuit after placement and routing are performed, without requiring complete re-synthesis of the integrated circuit design. The present invention optimizes the integrated circuit design based on accurate extraction and modeling of the interconnect network.

Figure 1A:
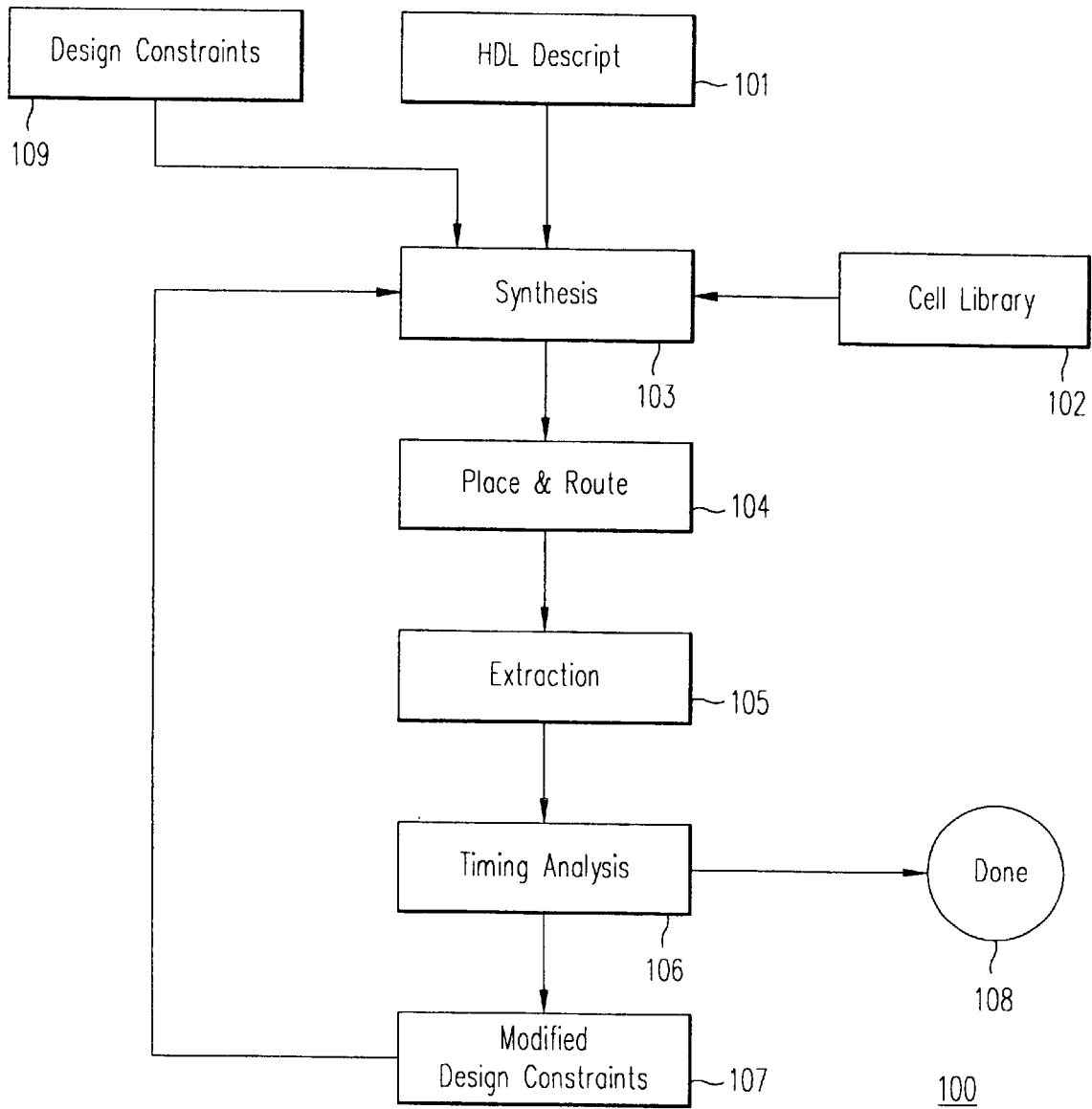
FIG. 1a shows a typical design flow 100 that an integrated circuit designer would use to design a standard cell-based integrated circuit.
Figure 1B:
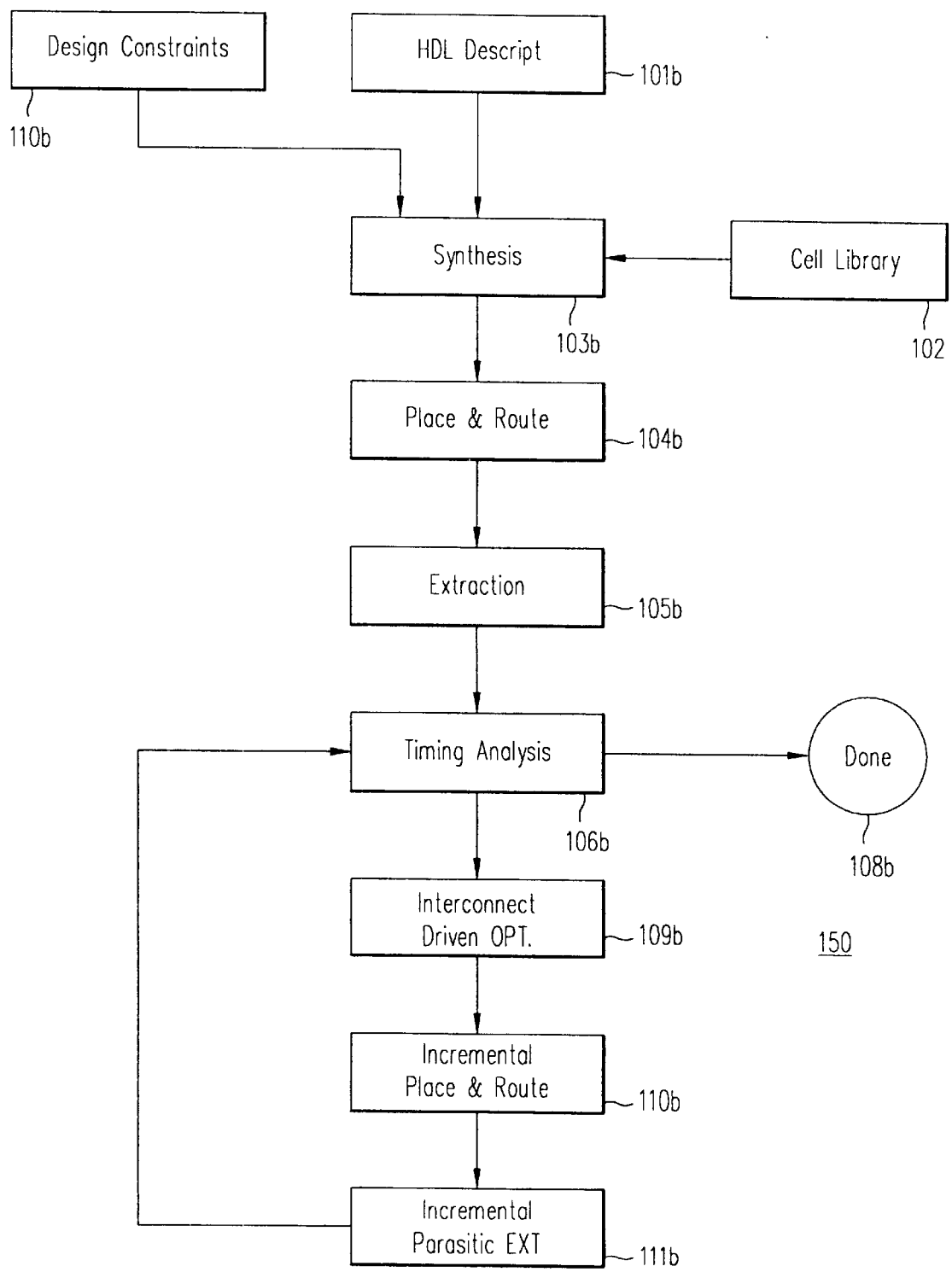
FIG. 1b shows design flow 150, in accordance with one embodiment of the present invention.

FIG. 1b shows an overview of design flow 150 in one embodiment of the present invention. Unlike the prior art, in the present invention, the integrated circuit design steps of synthesis, initial placement and initial routing are not re-iterated. Instead, modifications to the physical design are performed incrementally. After completing HDL description, synthesis, place and route, extraction and timing analysis steps 101b–106b, which can be substantially the same as corresponding steps 101–106 of FIG. 1a, the timing problems uncovered by timing analysis step 106b are addressed by an interconnect optimization step 109b. Step 109b fixes some or all of the timing problems using the local transformation techniques described below. These local transformations are realized at step 110b by providing incremental place and route directives to the corresponding place and route tools. At step 111b, an incremental extraction of parasitic impedance is performed on the revised physical design. Process flow 150 then returns to timing analysis step 106b to determine if the revised physical design meets all timing requirements. If not, step 109b, 110b and 111b are repeated.

Figure 2:
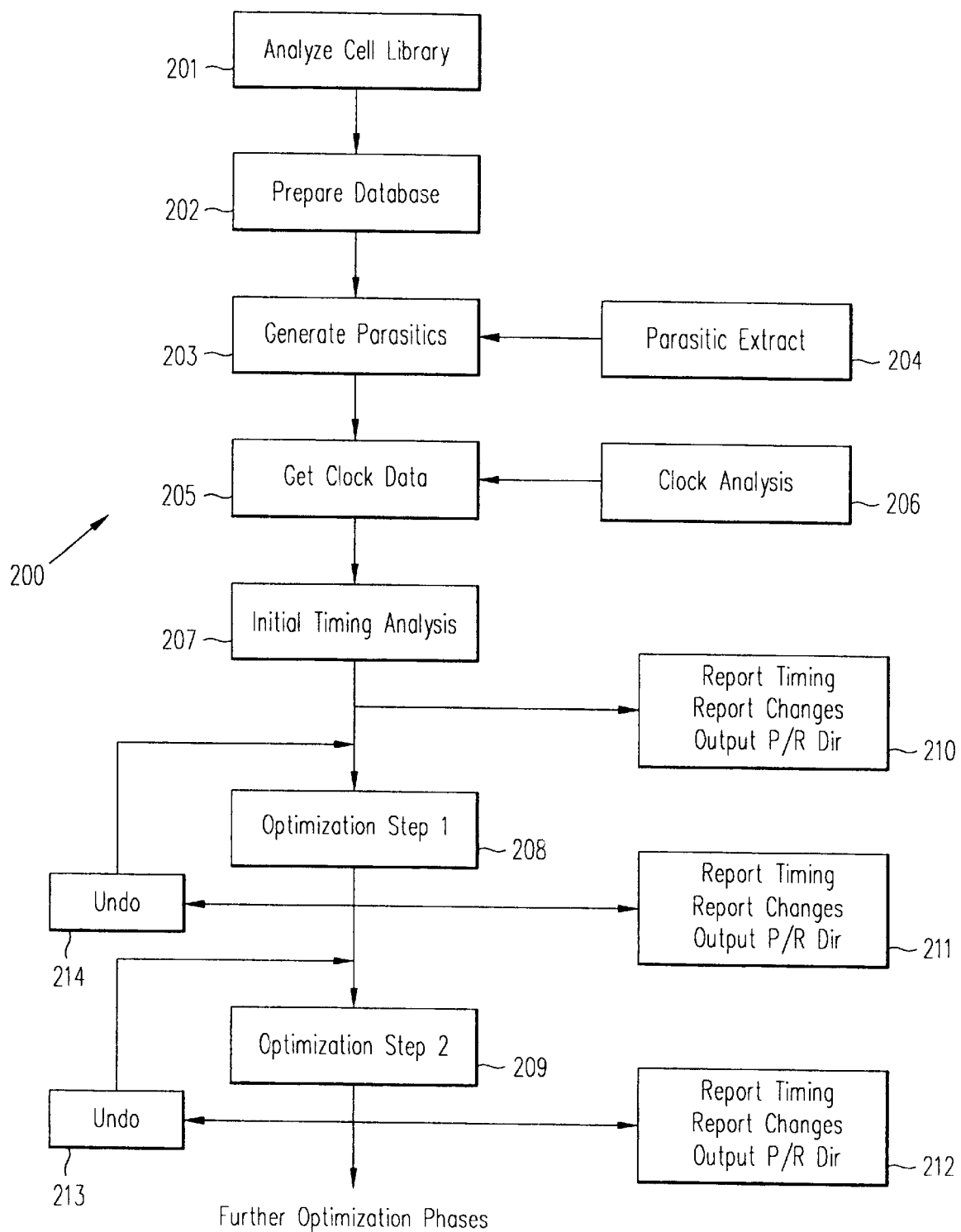
FIG. 2 shows design flow 200, representing the operations of step 109b of FIG. 1b, in one embodiment of the present invention.

FIG. 2 shows in further detail step 109b of FIG. 1b. As shown in FIG. 2, at step 201; a standard cell library (e.g., a ".lib" file of a format supported by Synopsys Corp.) is analyzed and characterized. Under step 201, cells are classified according to their logic functions (e.g., NAND gates of different drive strengths are grouped), and each cell's operating characteristics (e.g., drive strength at each output terminal and capacitance at each input terminal) are estimated, as explained in further detail below. The results are included in an augmented library file (in a suitable format, such as Copernicus Library Format or "CLF").

At step 202, the design database is prepared for receiving an input netlist. The design database provides data structures, described in additional detail below, for facilitating the optimization steps in FIG. 2. The synthesized, placed and routed physical design is then read into the database. The design is typically provided, for example, in the LEF and DEF file formats supported by Candence Design Systems Inc. In addition, timing and other constraints (expressed, for example, in an industry standard format, such as those formats used in the "Primetime" tool from Synopsys, Inc. or the "DesignCompiler" tool from synopsys Inc.) are also read into the database.

At step 203, parasitic impedance models ("parasitic" models) of interconnect wires are incorporated into the database. Parasitic models are provided by parasitic extractor 204, which can be implemented by, for example, the extraction tool "Columbus", which is available from Frequency Technology, Inc., Santa Clara, Calif. The parasitic models are incorporated into the initial netlist. Such parasitic models can include such circuit elements as resistors, capacitors and inductors.

At step 205, a clock tree analysis is performed by clock tree analyzer 206 to identify clock signals and clock signal paths. Clock tree analyzer 206 can be provided internally, or by an external clock tree analyzer (e.g. "Cartier" from Frequency Technology, Inc.) interfaced to the design tool of the present invention. The extracted clock information is incorporated into the design database.

At step 207, based on the clock analysis, the extracted parasitic models, the operational characteristics of the cell instances in the physical design, and the performance constraints of the physical design, an initial timing analysis is performed. In this embodiment, the initial timing analysis is performed by a static timing analyzer (STA), which is described in further detail below. In this static timing analysis step, the "slack" of each electrical terminal, or "pin," is calculated. On a pin, the term "slack" refers to the time difference between the latest signal arrival time and a required signal arrival time. A cell instance can also be assigned a slack, which is typically the least slack selected from the cell instance's input and output terminals.

Based on the slack values, the design tool of the present invention provides one or more optimization steps. To simplify presentation, only optimization steps 208 and 209 are explicitly shown in FIG. 2. In one embodiment of the present invention, four optimization steps (identified below as Phases 1–4 and described in further detail below) are provided in the design tool. In each optimization step, the physical design is modified by a number of local transformations—i.e., each transformation affects only a small number of closely related cell instances and nets. In one embodiment, the local transformations are reported and implemented by providing incremental placement and routing directives to a placement and routing tool (e.g., steps 210–212). At the end of each optimization step, a static timing analysis is performed, using the same STA mentioned above. If the timing constraints are met, further optimization is not necessary.

As mentioned above, in one embodiment, four optimization steps ("phases") are provided. In one embodiment, described below, the first three phases are arranged in such a manner that each phase has a potential for resulting in greater modification to the post-layout circuit than the previous phase (i.e., increasing "intrusiveness"). In the first phase ("Phase 1"), which is a "clean-up" optimization step, the physical design is inspected for load-driver mismatches. A load-driver mismatch occurs when a driver drives a load outside of the driver's optimal range. In Phase 1, to correct a load-driver mismatch, a cell instance can be upsized or down-sized to meet the required timing constraints (i.e., the mismatched cell instance can be replaced by a logically equivalent cell instance with more or less drive strength, or longer or shorter propagation delay).

In the second phase ("Phase 2"), "hot spots" are identified in the physical design. A "hot spot" is a cell with a potential timing improvement that can result in a substantial improvement in timing performance both locally and along signal paths that include this cell. In one embodiment, Phase 2 consists of two phases, referred to below as Phase 2A and Phase 2B. Phase 2A is based on a "total negative slack" calculation at each terminal. Negative slack at a terminal is the amount of time by which the expected signal arrival time at the terminal fails to meet the required arrival time, taking into consideration all timing paths leading to the terminal. "Total negative slack (or "TNS")" at a terminal is the cumulative negative slacks over all timing end points of interest. An endpoint having a positive slack is ignored. More detailed information regarding TNS can be obtained, for example, from Synopsys Inc. Depending on the nature of the hot spot, one or more local transformations can be applied to realize the timing improvements.

Because only local transformations are applied at Phases 1 and 2, the resulting modified physical-design does not require re-synthesis. In many physical designs, a very high percentage of all timing violations can be corrected by the local transformations of Phases 1 and 2. Thus, optimization of these physical designs can be achieved without reiteration of the time-consuming re-synthesis, placement and routing loop, thereby reducing the cost of an integrated circuit design.

In the embodiment mentioned above, in addition to Phases 1 and 2 described above, a third phase ("Phase 3") also applies local transformations to minimize worst negative slake (WNS), in signal paths. In a first part of a fourth phase ("Phase 4A"), "hold" timing violations in signal propagation paths are corrected. A "hold" time violation occurs when a signal transition at a clocked element (i.e., a sequential element, such as a flip-flop) occurs prior to the previous logic value of the signal is latched by the clocked element. A "setup" timing violation occurs when the clocked element latches a signal prior to the signal's arrival.

Finally, in the second part of the fourth phase. ("Phase 4B"), the physical design is examined to minimize overall silicon area, by downsizing appropriate cell instances.

In the present invention, because highly accurate parasitic models are used in the optimization steps, a more aggressive design style can be used. For example, a 50% WLM target can be set in the synthesis step, so as to leave a larger portion of the timing violations to be corrected by the optimization steps. Under such an arrangement, over-design in the final physical design is reduced, resulting in a lower silicon area and a more timing-efficient integrated circuit. Because the present invention applies local transformations, rather than relying on a global re-synthesis, changes to the placed and routed physical design are incremental and minimally intrusive. Physical design optimization can therefore be achieved much more quickly than in the prior art.

Figure 3:
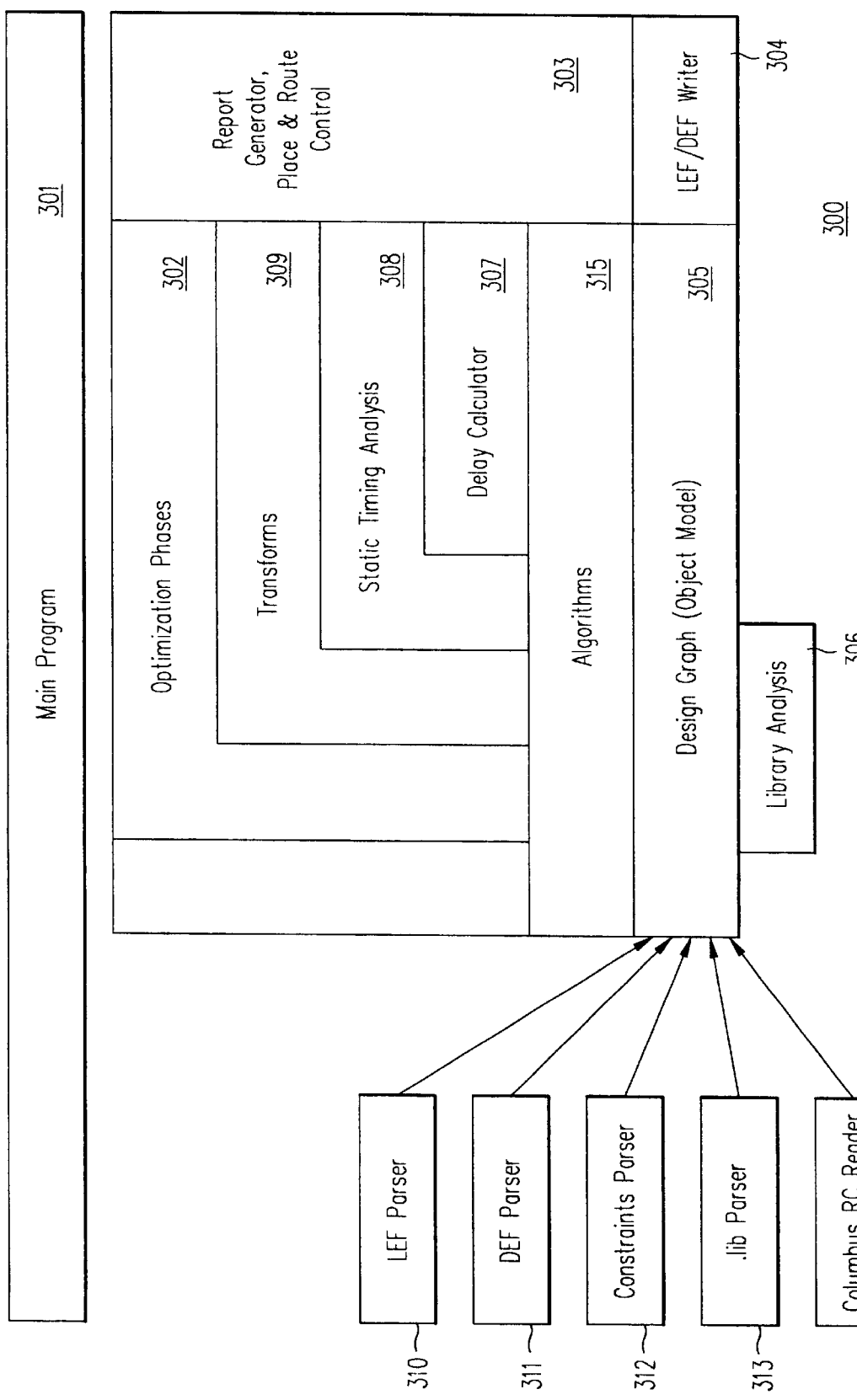
FIG. 3 is an overview of optimization tool 300 in one embodiment of the present invention.

FIG. 3 is an overview of optimization tool 300 in one embodiment of the present invention. Design tool 300 includes an overall control program 301, which controls and sequences the process flow 200 in FIG. 2, for example. In optimization tool 300, design database ("design graph") 305 contains the data structures representing the physical design at all times. Some examples of objects in design graph 305 includes:

a. "Macro"—a representation of a standard cell in the standard cell library;
b. "MacroPin"—a terminal of a Macro;
c. "Timing Arc"—a data structure representing the propagation delay between two MacroPins;
d. "Node"—an instance of a Macro;
e. "NodePin"—a terminal in a Node;
f. "Net"—a net connecting two or more NodePins;
g. "TransformFactory"—a data structure representing a collection of Net and Node changes to transform the design graph; and
h. "Transform"—an instance of a transformation in a TransformFactory.

To import the placed and routed physical design and the timing and performance constraints, interfaces 310–314 are provided. Interfaces 310–314 each translate design data or constraints expressed in an industry standard data format to internal data structure of design graph 305.

The physical design can be exported to an external tool to perform further design activities, such as to perform incremental placement and routing, or to perform more accurate extraction of parasitic impedance. Interface 304 translates selected data structures of design graph 305 into industry standard formats accepted by the external tool.

Algorithms 315 include routines for traversing design graph 305, thus allowing application programs in optimization tool 300 to extract information in design graph 305 in specified orders. Some examples of such routines include routines for returning a cluster, a cell, a net or a path in depth-first, breadth-first or another ranked order. (A cluster is a group of combinational logic elements between two clocked elements in common or related clock domains.) Specifically, algorithms 315 provide routines for a "forward sweep" and a "backward sweep" of a cluster. These operations are explained in further detail below. Algorithms 315 provide an internal interface between functional modules (e.g., transformation routines 309, described below) and design graph 305.

FIG. 3 shows four functional modules: optimization module 302, transform module 309, STA 308 and delay calculator 307. Delay calculator 307, which is described in further detail below, computes a delay in a given net using an "asymptotic waveform evaluation" (AWE) method. STA 308 performs both the initial static timing analysis (e.g., step 207 of FIG. 2) and the static timing analysis after each optimization step (e.g., steps 208–209), as mentioned above. To compute delay at a net, STA 308 invokes delay calculator

307. Transformation module 309 includes all programs for transforming a Node. During an optimization step, transformation module 309 invokes STA 308 to evaluate each applicable transformation. Optimization module 302 includes all programs for executing the optimization steps (e.g. Phases 1–5). Optimization module 302 invokes transformation module 309 to implement local transformations.

Figure 4:
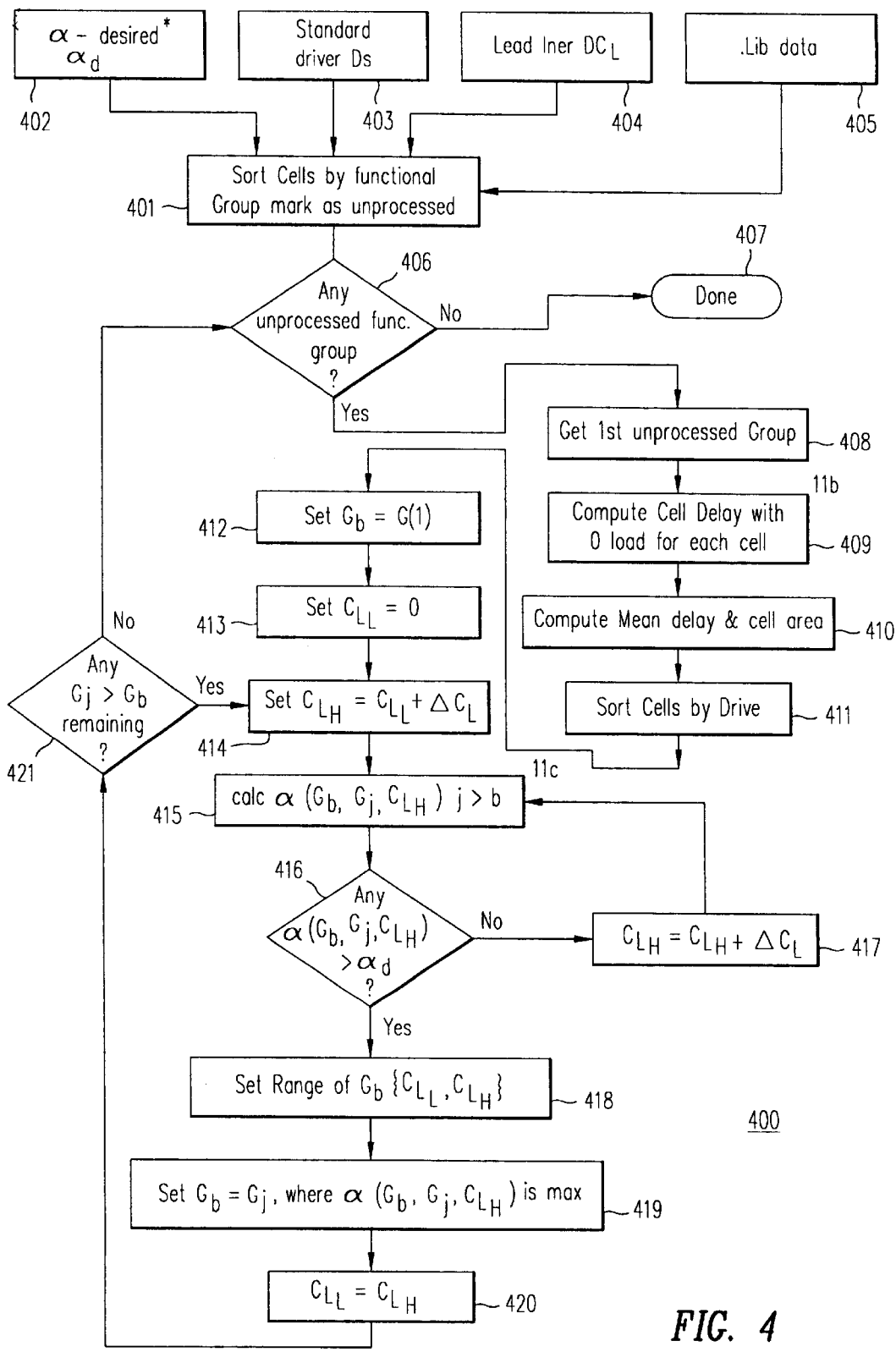
FIG. 4 is flow diagram 400 representing library analysis step 201 of FIG. 2.

Library analysis step 201 in FIG. 2 computes the appropriate operational output load ranges for the standard cells of each logic function. FIG. 4 is a flow diagram 400 representing library analysis step 201 of FIG. 2 in one embodiment. As shown in flow diagram 400 of FIG. 4, a user provides a desired relative "delay to area" tradeoff ratio ("$\alpha_{desired}$") 402, the basic driver 403 of the given technology (typically, a small buffer cell in the library), a "load increment" $\Delta C_L$ value 404 (i.e., the finest load capacitance resolution for the library analysis), and the standard cell library file (.LIB) 405, including all performance characterization data. A relative "delay to area" tradeoff ratio (denoted $\alpha_{i,j,k}$) is used to control cell selection. $\alpha_{i,j,k}$ is a measure of the delay advantage gained by replacing cell i by cell j under the condition of an output load k. Generally, a lower $\alpha_{i,j,k}$ results in a design optimized towards higher speed performance. Conversely, a higher $\alpha_{i,j,k}$ results in a design optimized towards reducing silicon area.

At step 401, the standard cells are grouped according to logic functions (e.g., NAND, OR, NOR, AND, XOR, etc.). Standard cells included in the same logic function group are interchangeable with respect to logic function. Two cells belong to the same function group if they have the same number of input and output terminals or "pins", perform the same logic function and provide, at each output pin, the same output "sense"—i.e., negative or positive logic. In addition, among the logic function groups., groups that perform "complementary" logic functions (e.g., AND and NAND) are identified. Standard cells in complementary logic function groups are interchangeable by the insertion of an inverter. Step 401 further identifies:

(a) buffers, inverters, and primary input and output cells (i.e., registers, flip-flops and other state elements) in the cell library;

(b) for each state element, clock signal terminals and the timing requirement between the clock terminal and each input or output terminal of the state element;

(c) for each cell, the area of the cell, the drive strength—i.e., delay as a function of load—of each output terminal and the loading of each input terminal; and (d) for each combinational logic cell, a propagation delay.

After the function groups are identified, library analysis step 201 examines all function groups individually (i.e., step 406 of FIG. 4). For each function group (selected at step 408), a zero-load cell delay is calculated for each standard cell within the function group (step 409). In the following, the delay for a standard cell i driving an output load $C_L$ is denoted by $D(i, C_L)$. Under this convention, the zero-load cell delay for cell i is denoted $D(i, 0)$. The zero-load cell delay $D(i, 0)$ of a given standard cell i can be obtained, for example, using delay calculator 307 of FIG. 3 by evaluating the standard cell's delay response when driven by basic driver 403 with an ideal rising or falling transition. In one embodiment, the standard cell's delay responses are estimated for both rising and falling transitions. Delay calculator 307 is discussed in further detail below.

At step 410, the mean value $D_m(0)$ of all zero-load delays in a function group and the mean area $A_m$ of all cells in that function group are computed. At step 411, the cells in the function group are sorted according to their drive strengths (e.g., in order of increasing area). The next steps (i.e., steps 412–421) find the operating ranges of the cells in the function group. The operating range of each cell is defined between a "low load" operating point ($C_{LL}$) and a "high load" operating point ($C_{HL}$)

The smallest driver (i.e., the driver with the smallest area) is examined first (step 412). This smallest driver is assigned a $C_{LL}$ of 0 pf (step 413) Beginning with a trial $C_{HL}$ value of $\Delta C_L$, the $C_{HL}$ of the cell is found iteratively by calculating, at step 415, the $\alpha_{i,j,k}$'s between the current cell i and all other stronger drive cells (j being the running index for these stronger drive cells) under the condition of an output load value k=$C_{HL}$. After each iteration of steps 415 and 416, the value of $C_{HL}$ is increased by $\Delta C_L$ (step 417).

An $\alpha_{i,j,k}$ is calculated according to the following equation:

$$\alpha_{i,j,k} = \frac{\frac{D(i,k) - D(j,k)}{D_m(0)}}{\frac{A(j) - A(i)}{A_m}}$$

in which, $D(i,k)$ and $D(j,k)$ are respectively the delays of cells i and j under a load k, $D_m(0)$ is the mean value of all zero-load delays for cells in logic function group, $A(i)$ and $A(j)$ are the areas of cells i and j, and $A_m$ is the mean area of all cells in the function group, as mentioned above.

If a cell j is found such that $\alpha_{i,j,k}$ exceeds $\alpha_{desired}$, the current $C_{HL}$ is the "high load" operating point for cell i (step 418). Cell j, which has the largest $\alpha_{i,j,k}$ that exceeds $\alpha_{desired}$, is selected (step 419) as the cell to operate in the next operating range, with a $C_{LL}$ value assigned the current $C_{HL}$ value (step 420), and an initial $C_{HL}$ equaling the current $C_{HL}$ plus $\Delta C_L$ (step 414). The next function group is selected (step 406) after all the cells in the present function group providing coverage for the operating ranges of interest are identified (as determined by step 421). Library analysis step 201 completes after all function groups are processed (step 407).

Figure 5A:
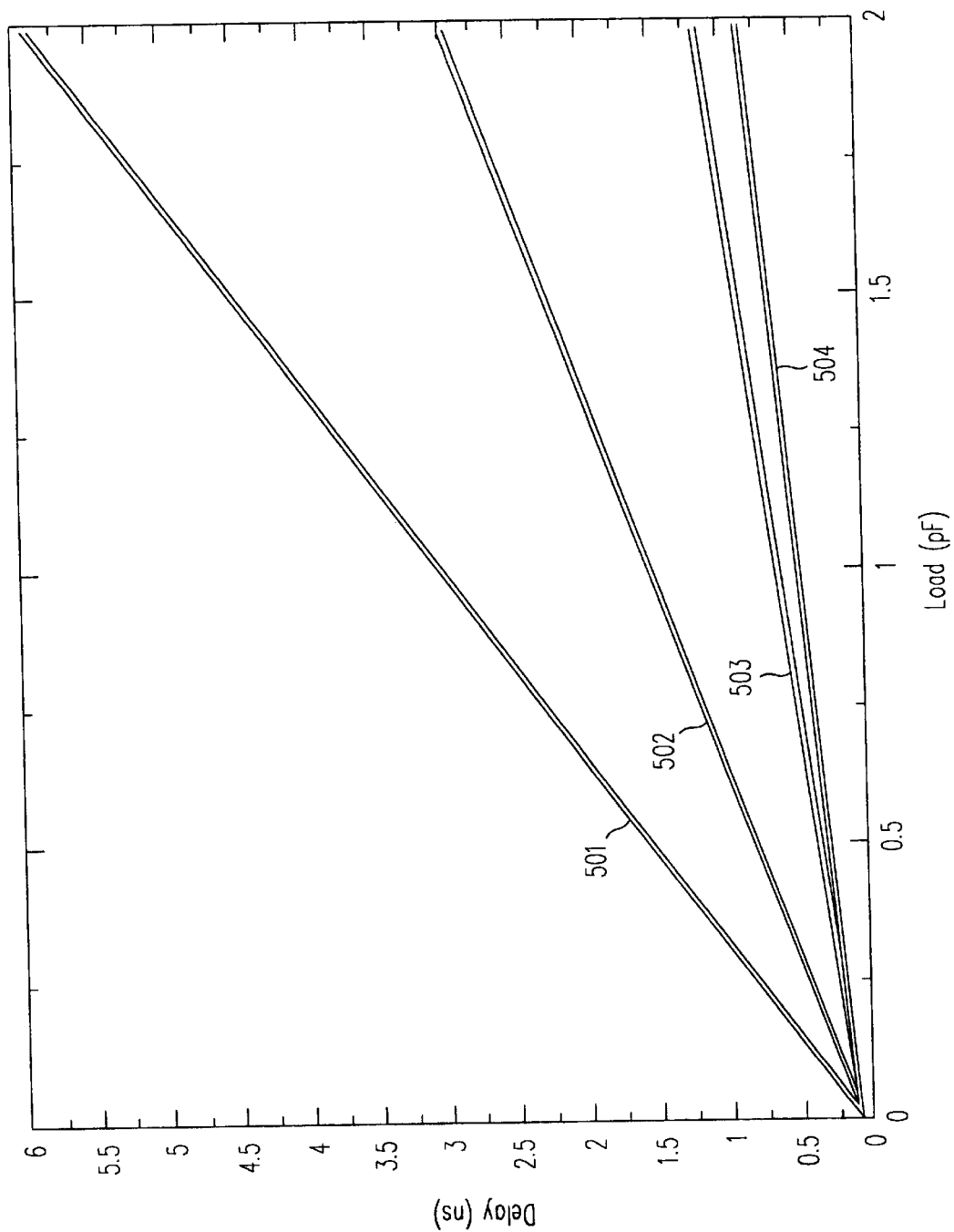
FIG. 5a shows the drive strengths of cells 501–504.
Figure 5B:
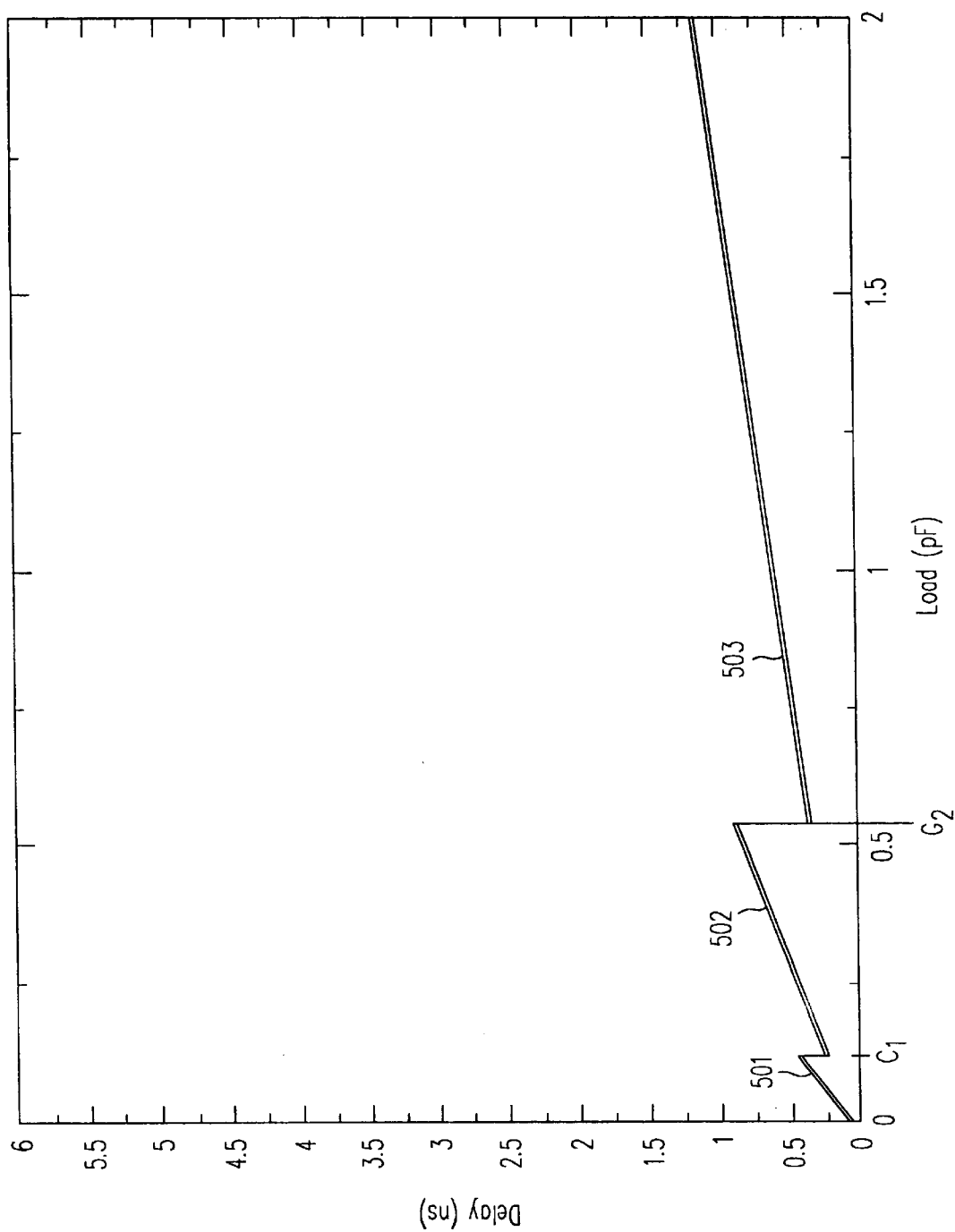
FIG. 5b shows, in the operating range of interest (i.e., 0 to 2 pf), process flow 400 found cells 501–503 which cover the entire operating range with their individual operating ranges 0 to $C_1$, $C_1$ to $C_2$, and $C_2$ to 2pf.

FIGS. 5a and 5b illustrate the results of applying process flow 400 to compute the operating ranges for standard cells in a NAND group. FIG. 5a shows the drive strengths of standard cells 501–504.

As shown in FIG. 5b, using process flow 400, the operating range of interest, zero to 2 pf, are found covered by standard cells 501–503, with operating ranges $(0, C_1)$, $(C_1, C_2)$, and $(C_2, 2)$ pf.

Figure 6:
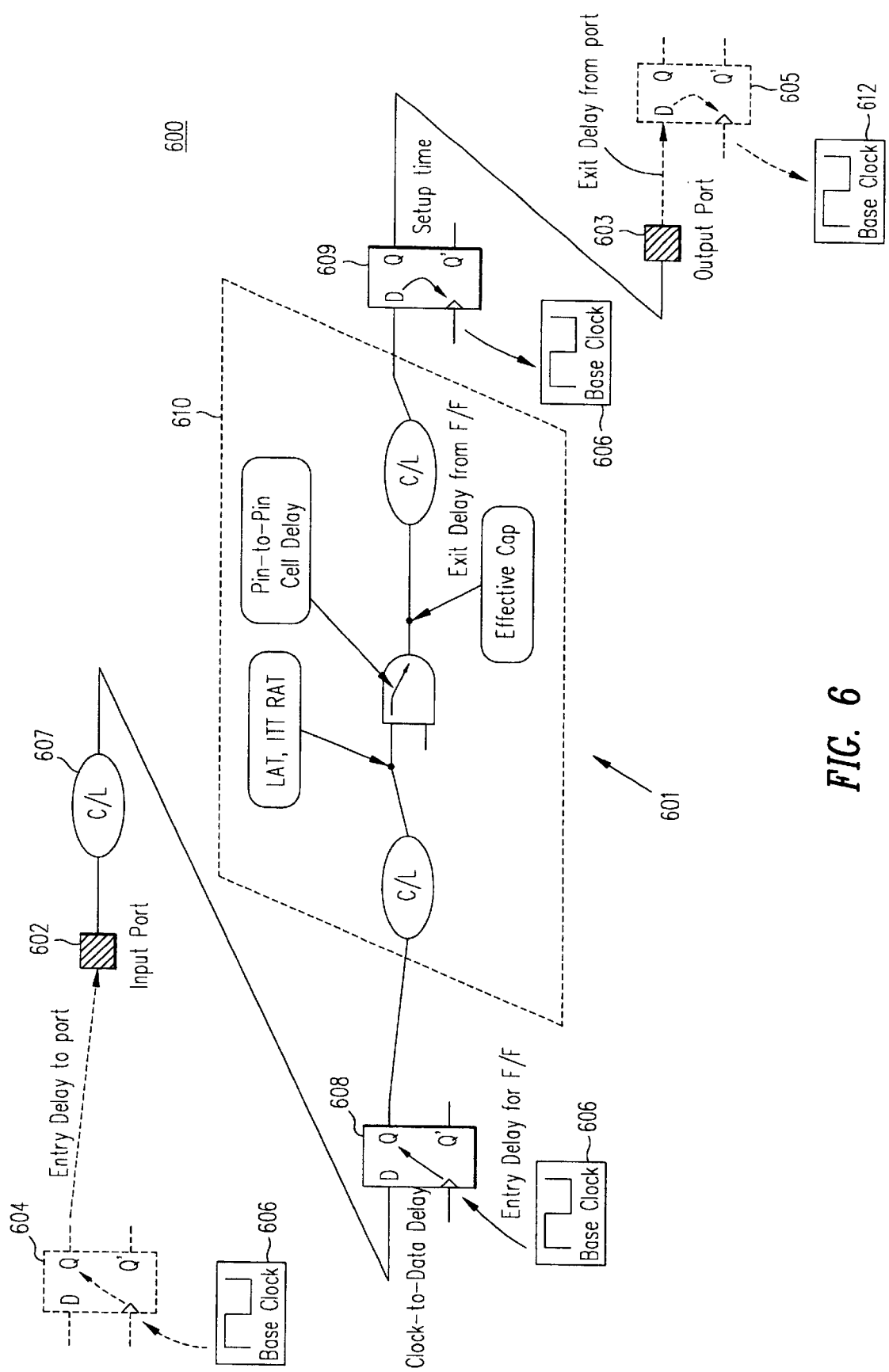
FIG. 6 shows a network model 600 used in STA 308.

As mentioned above, in one embodiment, timing analysis is provided by STA 308 of FIG. 3. STA 308 can be called upon to compute path delays in circuits that can include state elements and combinational logic elements. In one embodiment of the present invention, cell instances in the design database that are inserted or modified since the last timing analysis are marked. Incremental timing analysis is achieved by computing timing for these marked instances and instances whose timing is affected by such marked instances. Suitable techniques for providing this incremental timing analysis capability can be found, for example, in "An Algorithm for Incremental Timing Analysis," by Lee et al., published in *The Proceedings of the 32$^{nd}$ ACM/IEEE Design Automation Conference* (1995). FIG. 6 shows a network model 600 used in STA module 308. The signal arrival time at input terminal 602 is provided by an "entry delay" relative to a clock signal 606, based on an assumption that the input signal is driven by an output driver of an upstream state element 604. Similarly, the required signal arrival time at output terminal 603 is provided by an "exit delay", relative to clock signal 612, based on an assumption that the output signal is fed into an input terminal of second state element 605. Entry and exit delays are computed from clock terminals identified by a clock analysis step, such as clock analysis step 206 of FIG. 2. To accommodate interacting clocks, clock skews and offset between clocks are modeled in STA 308.

STA module 308 can use a primary input terminal, a clock terminal in a state element, or a terminal with user-specified constraints as a start timing point. Similarly, STA 308 can use a primary output terminal, a terminal with a defined setup time or a terminal with user-specified constraints as a timing end point.

Circuit 601 includes clusters 607 and 610, which are each a combinational circuit that couples an output terminal of a first state element and an input terminal of a second state element. Cluster 607 is a combinational circuit between flip-flops 604 and 608, and cluster 610 is a combinational circuit between flip-flops 608 and 609. Timing within a cluster is calculated "stage" by "stage" using, for example, delay calculator 307, which is mentioned above. A stage begins at the input terminals of a driver cell instance providing output signals, and ends at the input terminals of receiver cell instances receiving the driver cell instance's output signals. Instead of delay calculator 307, commercial timing calculators, such as "PrimeTime", from Synopsys Corporation, or the "Central Delay Calculator", from Cadence Design Systems can also be used.

To allow signal timing through a stage to be calculated, STA 308 requires (a) pin-to-pin cell delays from the cell library, which can be estimated, for example, in library analysis step 201 of FIG. 2, as mentioned above, and (b) interconnect parasitic models, which can be extracted, for example, by parasitic extraction step 204 of FIG. 2, as mentioned above. STA 308 also accepts from a user a list of false paths, which guides the timing analysis and allows more accurate results. STA 308 computes (a) for each input and output terminal, a "worst" slack value, (b) for each cell instance, a cell delay, and (c) at each output[]terminal of a cell instance, an "effective load" model.

To perform a timing analysis, STA 308 performs a "forward sweep" and a "backward sweep." In a forward sweep, STA 308 starts from the start timing points and traverses cell instances and parasitic models level by level (i.e., using the well-known critical path method, or "CPM") to compute a "latest arrival time" (LAT) at each terminal. LAT is the longest cumulative delay to the current pin relative to a timing start point. (The LAT at a timing start point is the "entry delay.") During a forward sweep, the timing of a cell instance or parasitic model is computed only after the timing for all cell instances driving the input terminals of the cell instance or parasitic model are computed. The timing data associated with a forward sweep are: (a) the LAT at each input terminal; (b) the input transition time used to compute the delay at each input terminal; and (c) pin-to-pin delay between any input terminal of the cell instance or parasitic model to any output terminal of the cell instance or parasitic model.

In a backward sweep, STA 308 starts at the timing end points and traverses cell instances and parasitic models level by level to compute a "required arrival time" (RAT) at each terminal. RAT is the longest cumulative delay from the current pin relative to a timing end point. (RAT at a timing end point is the "exit delay.") During a backward sweep, the RAT is computed only after computing RATs for all cell instances connected to the output terminals of the cell instance. When both RAT and LAT are available at a terminal, a "slack" value for the terminal—defined as the difference between the required arrival time and the latest arrival time (RAT-LAT)—is computed. If the slack is negative, i.e., the expected latest arrival time is later than the required arrival time, a timing violation is detected. Where multiple slacks can be computed at a terminal, the smallest slack among the multiple slacks (which may be negative) is selected as the "cell slack".

To compute a delay, delay calculator 307 uses a graph of the stage, parasitic models representing the interconnect wires between the output terminals of the driver cell instance and the input terminals of the receiver cell instances, and input time transitions at all input terminals of the driver cell instance. Delay calculator 307 outputs delay and transition times for both positive- and negative-going transitions at each. output terminal of the driver cell instance and at each input terminal of the receiver cell instances. In addition, as mentioned above, an effective load model is provided to each output terminal of a cell instance.

Figure 7:
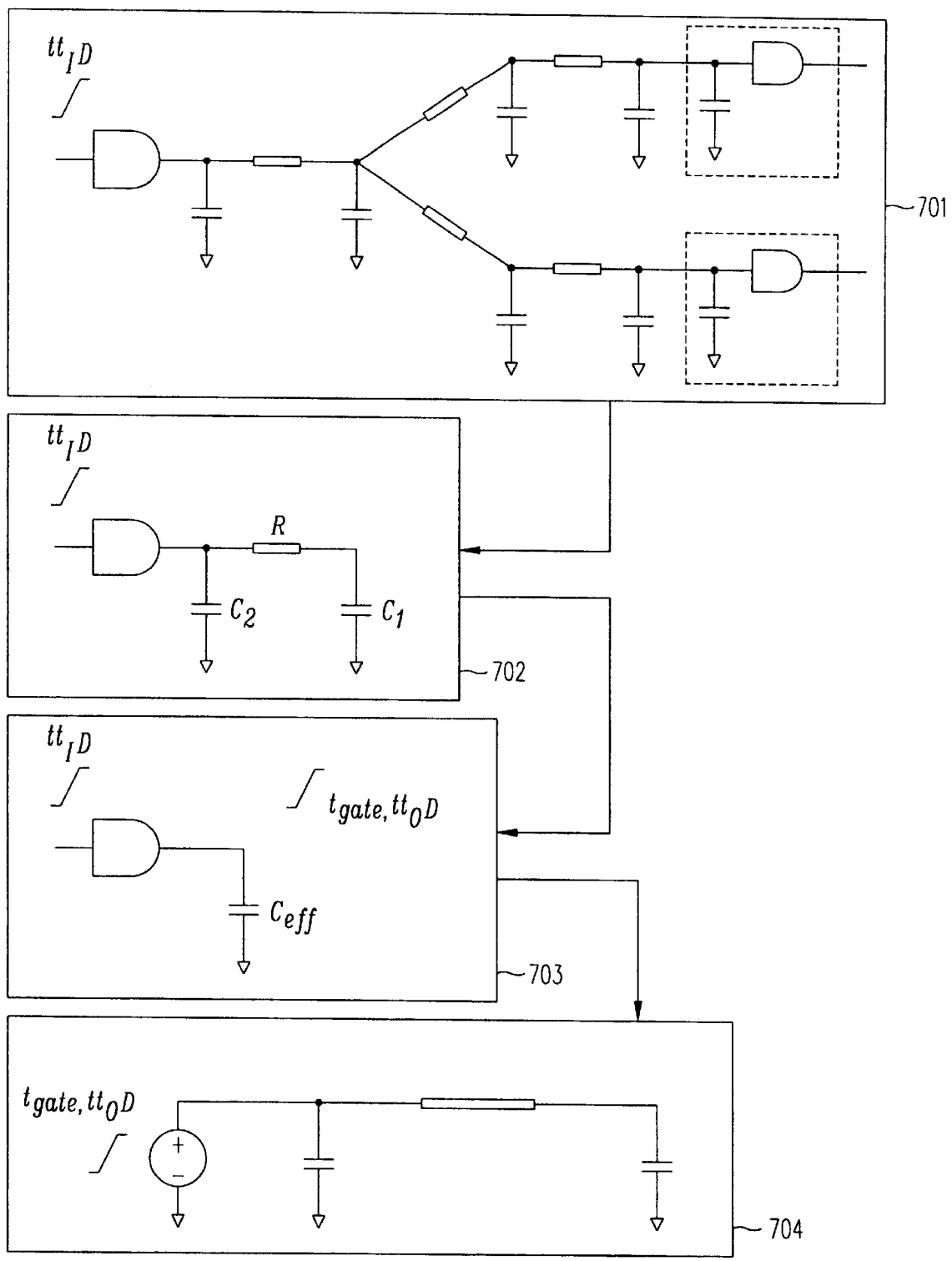
FIG. 7 is a flow diagram 700 that illustrates the operations of delay calculator 307.

FIG. 7 is a flow diagram 700 that illustrates the operations of delay calculator 307. As shown in FIG. 7, at step 701, for each input terminal of a receiver cell, a capacitance is obtained from the cell library to represent the capacitance load at the input terminal of the receiver cell instance. Next, at step 702, using AWE techniques, the parasitic model of the interconnect wires between the output terminal of the driver cell instance and an input terminal of a receiver cell instances is combined with the input capacitances at the receiver cell instances to create a reduced-order model. In one embodiment, as shown in FIG. 7, a π-model is provided using the first three moments of the driving point admittance. A suitable method for creating a π-model from the first three moments is described, for example, in "An explicit re-circuit delay approximation based on the first three moments of the impulse response," by Tutuianu et al., *IEEE Design Automation Conference*, 1996. Higher accuracy can be achieved using higher order models.

At step 703, the size of the "effective load" capacitor $C_{eff}$ is iteratively derived by equating the average current from the reduced-order model with the single capacitor model. Also, during this step, using the input transition time ("slew rate") at each input terminal of the driver cell, a gate delay gate and an output transition time or slew rate at an output terminal of the driver cell instance are computed.

Finally, at step 704, using the reduced-order model of step 702, and the output transition times computed at step 703, the input transition time at each input terminal of the receiver cell instances is calculated. In one embodiment, the input transition times are obtained using a Newton-Raphson iteration scheme on the π-model mentioned above.

Figure 8:
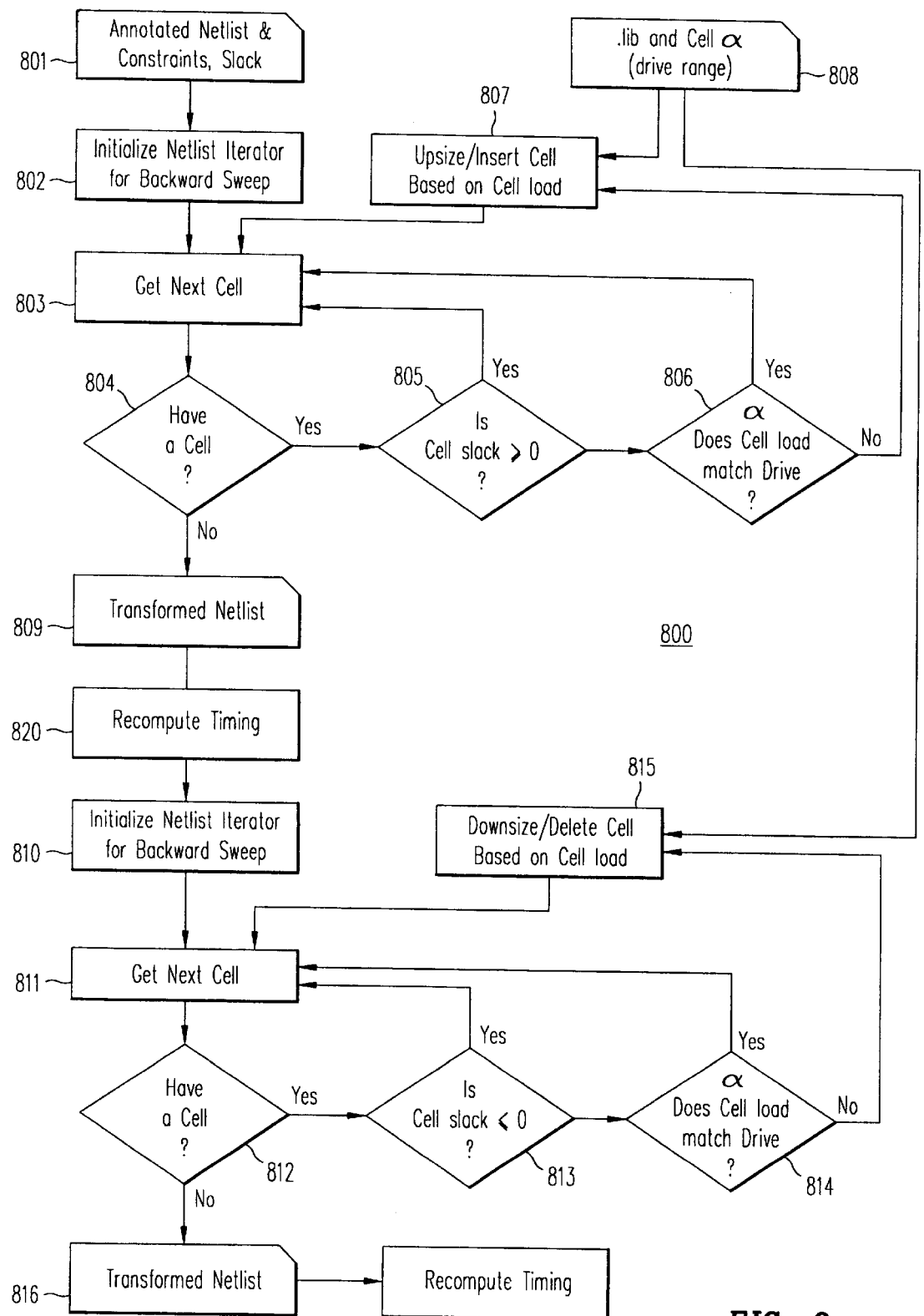
FIG. 8 is a flow diagram 800 showing the operations of Phase 1 optimization, according to one embodiment of the present invention.

As discussed above, after the initial timing analysis of step 207 (FIG. 2) is completed, Phase 1 optimization of step 208 is performed. FIG. 8 is a flow diagram 800 showing the operations of Phase 1 optimization, according to one embodiment of the present invention. As shown in FIG. 8, Phase 1 begins at step 801 by receiving a netlist annotated with performance constraints and slack values from initial timing analysis step 207. (In the following, a netlist including slack values and performance constraints is referred to as an "annotated netlist".) After the appropriate routines in algorithms 315 are invoked to set up a "backward sweep" traversal of the netlist (step 802), each cell instance encountered during the backward sweep is examined (step 803). At step 805, if the cell slack is determined to be non-negative, i.e., no timing violation has occurred at that cell, the cell is skipped over. However, if the cell slack is determined to be less than zero, the effective load $C_{eff}$ of the cell instance is then examined to determine if $C_{eff}$ is within the operating range of the cell instance. If $C_{eff}$ is within the operating range of the cell instance, nothing further is done for that cell instance. Otherwise, i.e., if $C_{eff}$ is not within the operating range of the cell instance, one of the following local transformations is invoked at step 807: (i) replacing the current cell instance by a larger cell instance in the same function group with an operating range covering $C_{eff}$; (ii) inserting a buffer that has an operative range covering $C_{eff}$, or (iii) replacing the current cell instance by a combination of an instance of a cell in the complementary function group and an inverter with a drive covering $C_{eff}$.

After algorithms 315 complete the "backward sweep" traversal of the netlist discussed above, timing is recomputed at step 820. Then, a second "backward sweep" is set up at step 810. Again, each cell instance encountered during the backward sweep is examined (step 811). At step 813, if the cell slack is determined to be negative, i.e., a timing requirement violation has occurred, the cell instance is skipped over. Skipping over this cell instance avoids creating a worse a timing violation as a result of a downsizing step or a buffer elimination step. Downsizing and buffer elimination are local transformations that can be applied at this second backward sweep. However, if the cell slack is determined to be non-negative, i.e., no timing violation has occurred, the effective load $C_{eff}$ of the cell is examined to determine if $C_{eff}$ is within the operating range of the cell instance. If $C_{eff}$ is within the operating range of the cell instance, nothing further is done for that cell instance. Otherwise, i.e., if $C_{eff}$ is not within the operating range of the cell instance, one of the following transformations is invoked at step 815: (i) replacing the current cell instance by a smaller cell instance in the same function group with an operating range covering $C_{eff}$; or (ii) removing a buffer, so as to allow the drive strength of the previous cell instance to directly drive $C_{eff}$, or (iii) replacing the current cell instance by a combination of a cell instance in the complementary function group and an inverter with a drive operating range covering $C_{eff}$.

Figure 9A:
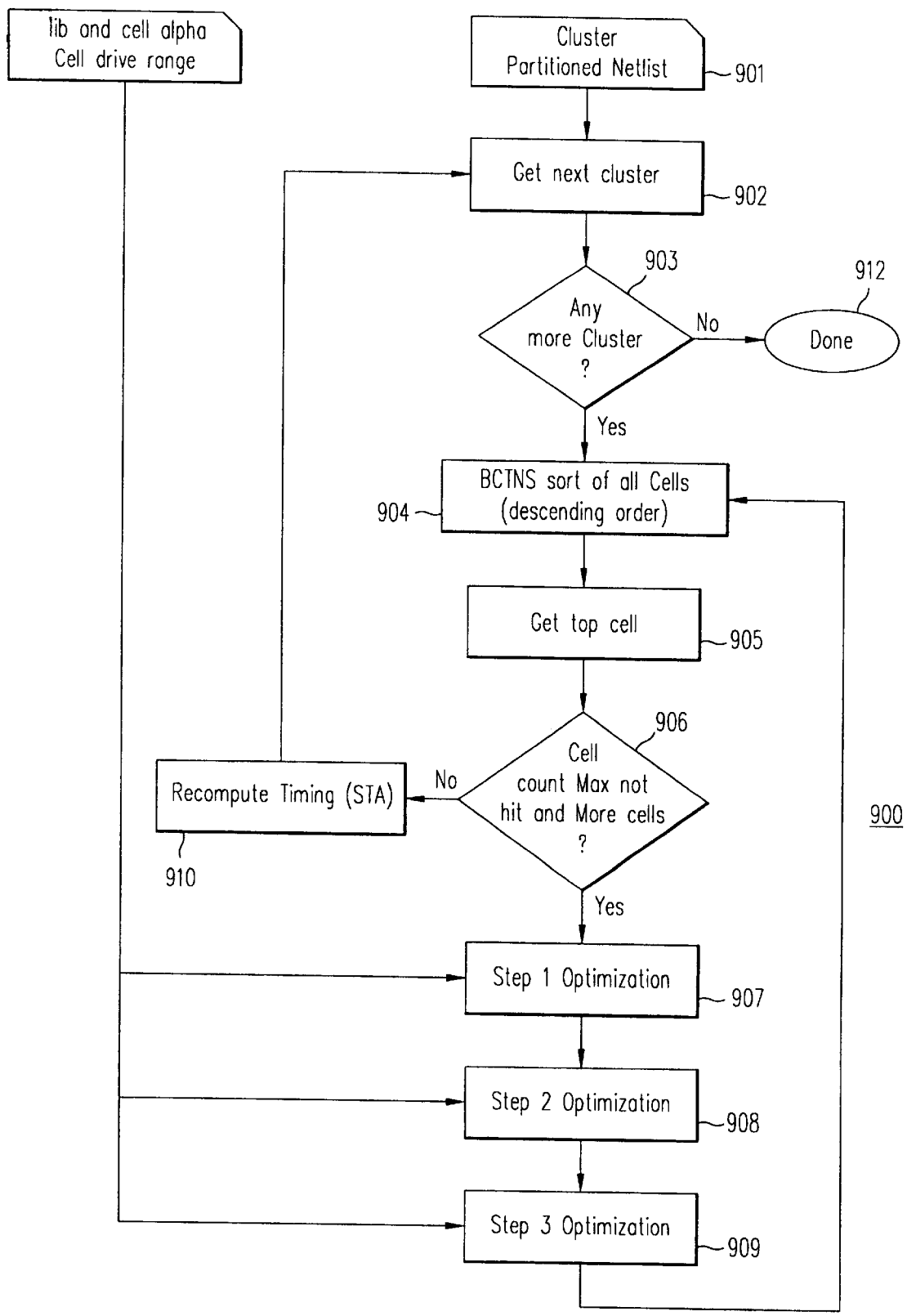
FIG. 9a is a flow diagram 900 providing an overview of the optimization steps in Phase 2A.

At Phase 2A, optimization is performed using a "bidirectional combinational total negative slack" (BCTNS) algorithm. FIG. 9a is a flow diagram 900 showing an overview of the optimization steps in Phase 2A. As shown in flow diagram 900, the physical design is first partitioned into clusters at step 901. (In the following, a netlist that has its logic circuits partitioned into clusters is referred to as a "cluster-partitioned netlist"). Optimization under the BCTNS algorithm proceeds on a cluster by cluster basis (i.e., repeating steps 902–910), until all clusters are optimized (step 912). For each cluster, the cells within the cluster are first ranked by BCTNS sorting step 904 in descending order of worst BCTNS values. A user-specified number of cells are then selected one by one in the sorted order (steps 905 and 906) for optimization. BCTNS values are recomputed after each optimization pass.

Figure 10:
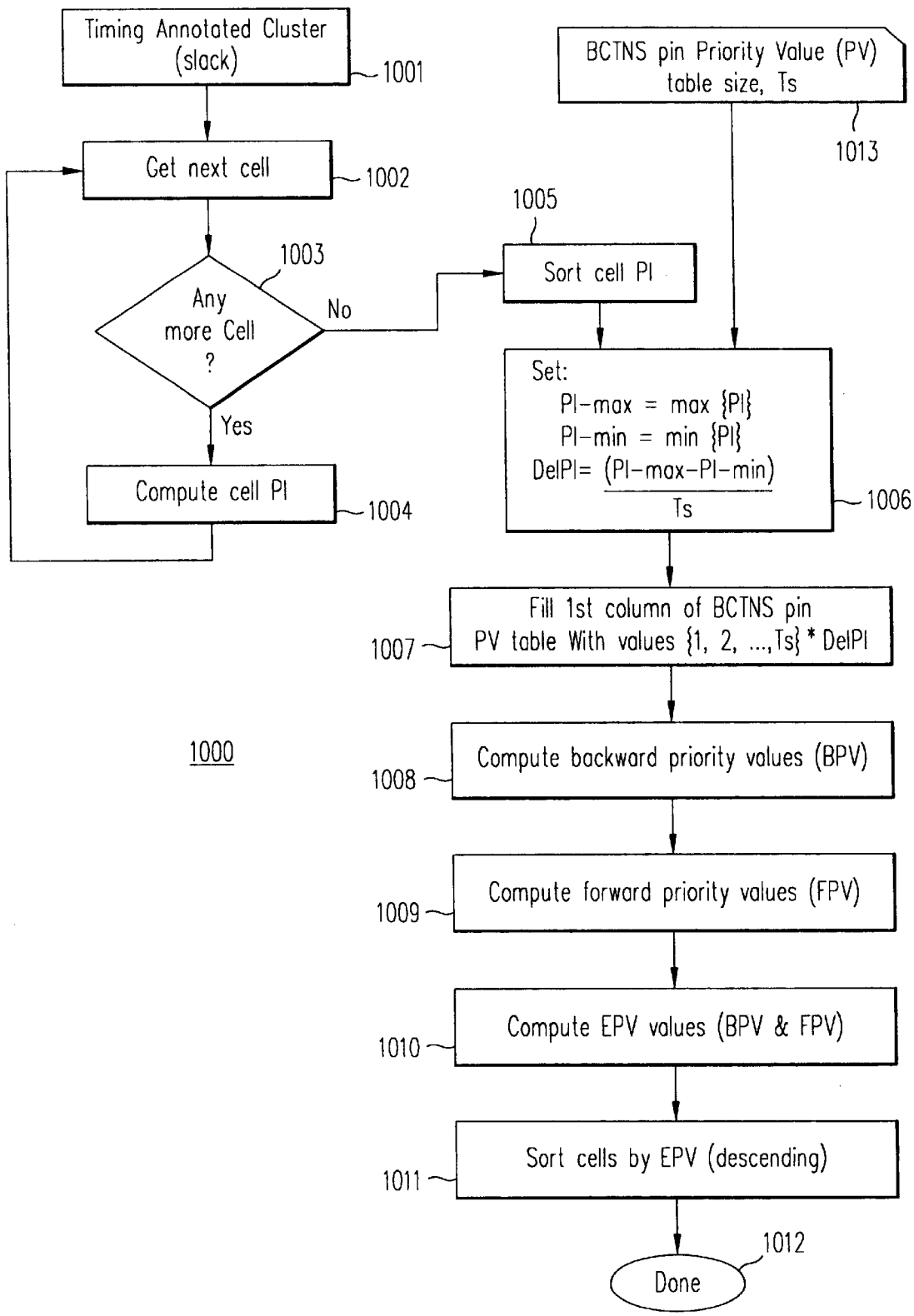
Figure 11A:
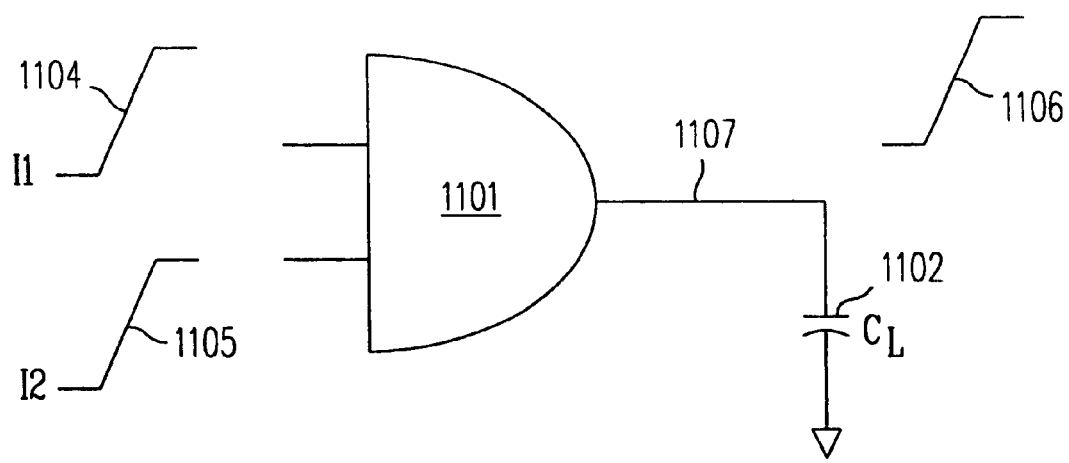
FIG. 11a shows cell instance 1101 with its output "effective load" modeled by capacitor. 1102 ($C_L$) and input and output signal transition times 1104, 1105 and 1106, as computed by delay calculator 307.

BCTNS sorting step 904 is illustrated by flow diagram 1000 of FIG. 10. As mentioned above, prior to Phase 2A, STA 308 annotates slack values on the physical design. Then, at steps 1002–1004, the BCTNS algorithm computes a "potential improvement" (PI) value for each cell in a given cluster. PI is computed according to the circuit models shown in FIGS. 11a and 11b. FIG. 11a shows cell instance 1101 with its output "effective load" modelled by capacitor 1102 ($C_L$) and input and output signal transition times 1104, 1105 and 1106, as computed by delay calculator 307 in the manner described above. As computed by delay calculator 307, the delay between an input terminal of cell instance 1101 and output terminal 1107 is denoted $D_{current}$.

Figure 11B:
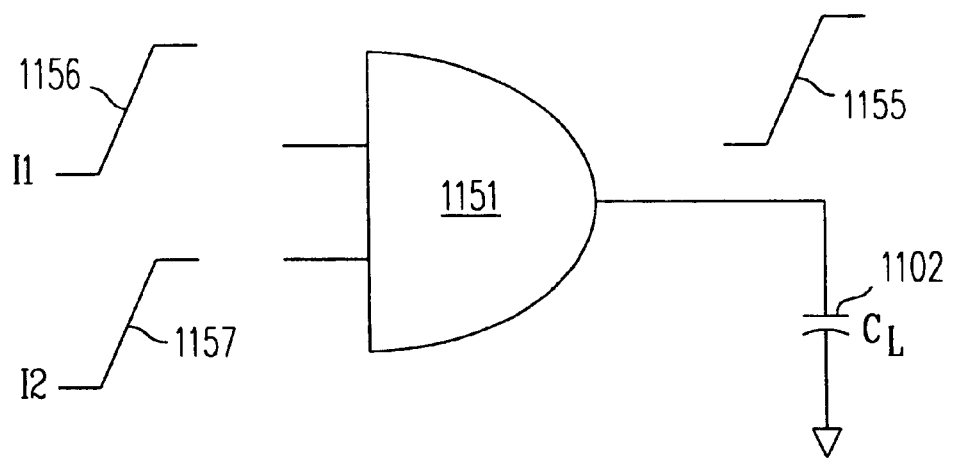
FIG. 11b shows assumed operating conditions necessary to achieve a largest possible delay improvement of cell instance 1101.

To compute PI, the largest possible delay improvement is assumed to be achievable by replacing cell instance 1101 by the optimal driver as in the function group. FIG. 11b shows the assumed operating conditions necessary to achieve PI. In FIG. 11b, cell instance 1101 is replaced by cell instance 1151, which is the largest driver in cell instance 1101's function group with each input terminal driven by basic drivers with an ideal step waveform. Delay calculator 307 then computes, the delay $D_{best}$ under the conditions of FIG. 11b. PI is defined as the difference between $D_{current}$ and $D_{best}$.

After the PIs for all the cell instances in the cluster are computed, the largest PI ($PI_{max}$) and the least PI ($PI_{min}$) obtained for the cluster are identified (step 1005). For each terminal in the cluster, a data structure is created to represent a three-column table ("Priority Value" or PV table) having a user-specified number $T_S$ of rows (step 1013). The value $r*\Delta_{PI}$, where $\Delta_{PI}$ is $(PI_{max}-PI_{min})/T_S$, fills column 1 of each row r of the PV table, denoted by "PV(r,1)" (step 1007). At step 1008, according to the method illustrated in FIGS. 12a–12d and described below, column 2 ("PV(r, 2)") of each PV table in the cluster is filled by backward propagation of PV values from the output terminals of the cluster. At step 1009, according to the method illustrated in FIGS. 14a–14d and described below, column 3("PV(r, 3)") of each PV table in the cluster is filled by forward propagation of PV values from input terminals of the cluster. Then, at step 1010, using columns 2 and 3 of the PV table of each cell and the associated PI value, and the size of the cell, an "equivalent priority value" ("EPV") is computed for each cell according to flow diagram 1600 of FIG. 16. At step 1011, BCTNS sort step 904 for the cluster is complete after the cells in the cluster are ranked in decreasing EPV order.

Figure 12A:
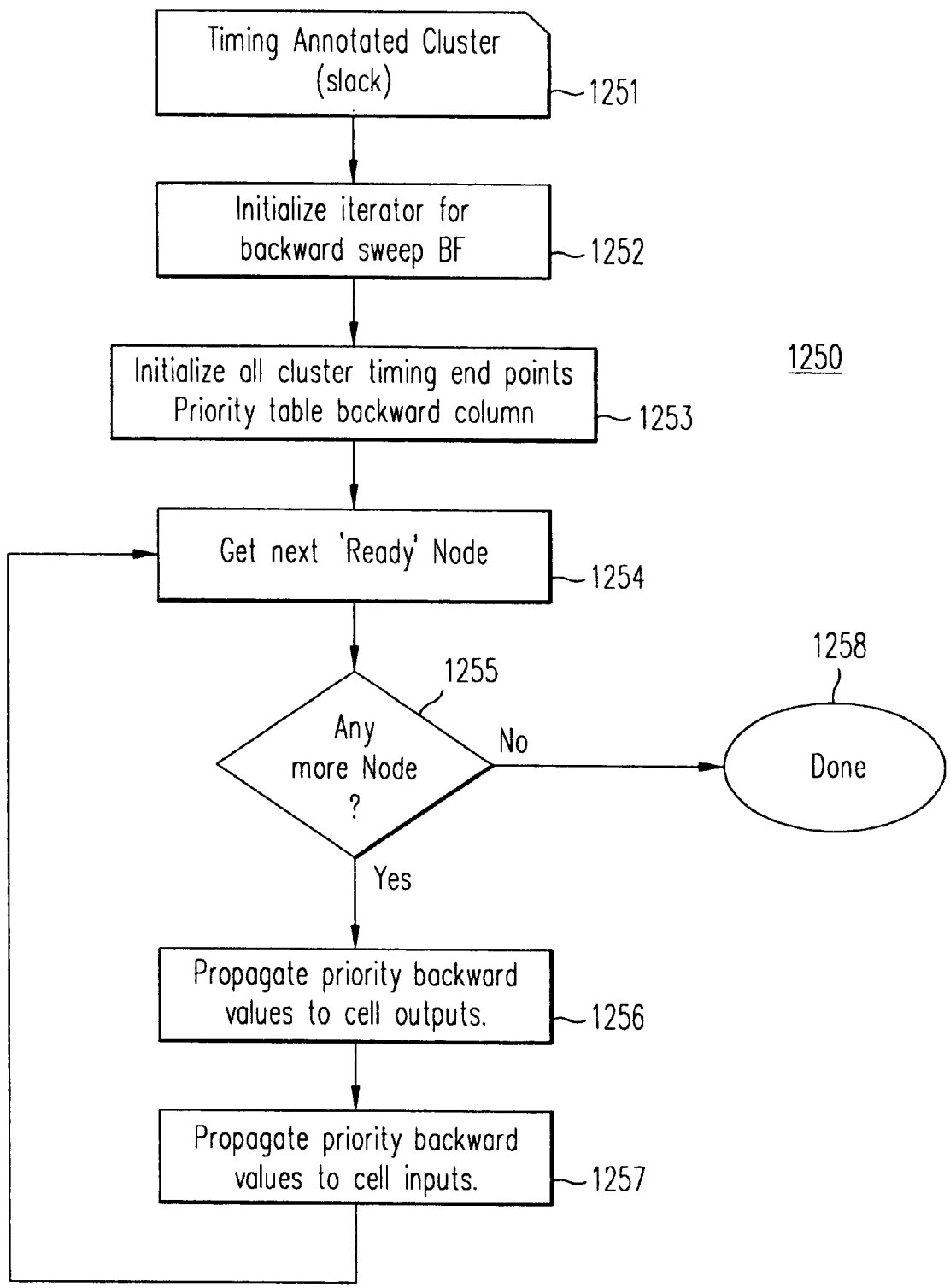
FIG. 12a is a flow diagram 1250 showing the operations of backward propagation of PV values at step 1008 of FIG. 10.

Backward propagation of PV values step 1008 of FIG. 10 is illustrated by flow diagram. 1250 of FIG. 12a. As shown in flow diagram 1250, backward propagation of PV values begins from a timing-annotated cluster (step 1251). Algorithms 315 routines for traversing the cell instances of the cluster are initialized at step 1252. Then, at step 1253, a backward column initialization step 1253 fills column 2 of the PV table for each output terminal of the cluster, as discussed below in conjunction with FIG. 12b. Subsequently, at steps 1254–1257, a backward sweep traces from the output terminals of the cluster stage by stage back to the input terminals of the cluster. In this embodiment, at each stage, the backward sweep first propagates PV values at the output terminals of the parasitic interconnect model to the input terminal or terminals of the parasitic model (step 1256), and then continues to propagate the PV values at these input terminals of the parasitic interconnect model over the cell instance to the input terminals of the cell instance (step 1257). For each stage, the nets of the input terminals of the stage are taken as the output terminals of the stage become "ready". A net is said to be "ready" in this context after the values in the second column (i.e., PV(r, 2)) of its PV table are filled. Backward propagation of PV values is complete when all ready nets are traversed.

Figure 12B:
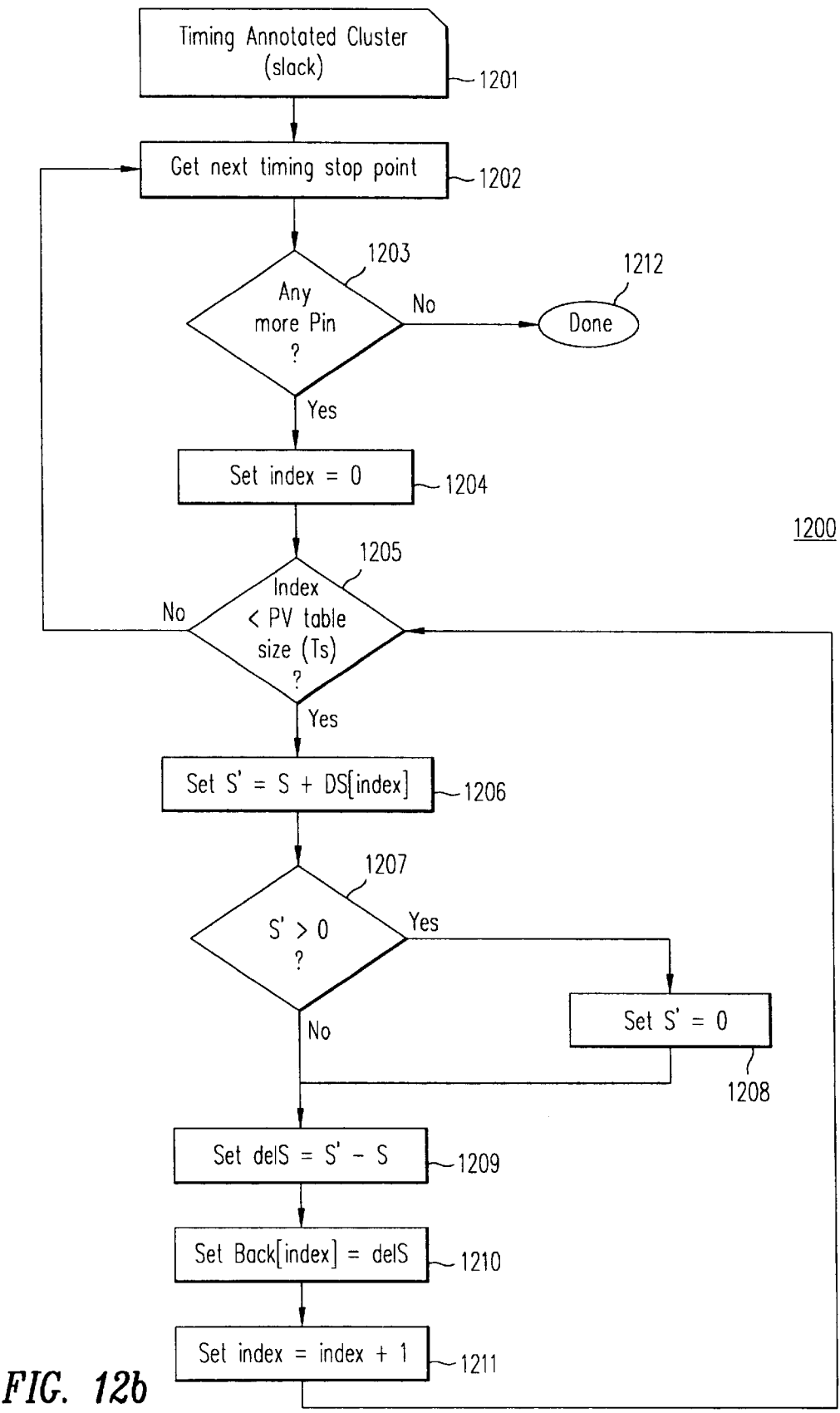

Flow diagram 1200 of FIG. 12b illustrates backward column initialization step 1253. As shown in backward column initialization flow diagram 1200, initialization step 1253 begins at step 1201 with a timing-annotated cluster, as discussed above. In flow diagram 1200, steps 1202–1211 fill column 2 of the PV table of every output terminal (i.e., the timing end points) of the cluster. For each row r of the PV table for a cell instance, the slack S for the output terminal is added to potential improvement value PV(r, 1) in the first column of the same row r (step 1206) to provide an improved slack value S' for that output terminal. If improved slack value S' is greater than 0 (i.e., timing is met by this improvement), the improved slack value is set to 0 (steps 1207 and 1208). Otherwise, an incremental improvement value ΔS which equals the difference between the improved slack and the current slack (i.e. ΔS=S'−S) is obtained at step 1209. The backward PV value of row r (i.e., PV(r, 2)) for that output terminal is provided as the incremental improvement value for the corresponding PI value of column 1 of the PV table (i.e., ΔS*PV(r, 1)).

As discussed above, PV values are propagated at steps 1256 and 1257 by a backward sweep over parasitic interconnect models and over cell instances, respectively. When a parasitic model is driven by multiple input terminals, as illustrated by FIG. 13a, or is driven by an output terminal of a cell instance having multiple input terminals, as illustrate by FIG. 13b, the values in the PV table of the output terminal are propagated to divergence points. For example, in FIG. 13a, the values of the PV table of output terminal 1301 are propagated backwards to the PV tables of input terminals 1302 and 1303. Similarly, in FIG. 13b, the values in the PV table of output terminal 1304 of cell 1307 are backward propagated to the PV tables of input terminals 1305 and 1306 of cell instance 1307. If multiple output terminals of a parasitic model are driven by a single input terminal of the parasitic interconnect model, as illustrated in FIG. 13c, the values of the PV table of output terminals of the parasitic interconnect model (e.g., output terminals 1321, 1322 and 1323) are propagated to a merge point at terminal 1324. In this embodiment, different procedures are provided for backward propagation of the values of a PV table for propagating to divergence and merge points, as illustrated by the flow diagrams in FIGS. 12c and 12d, respectively.

Figure 12C:
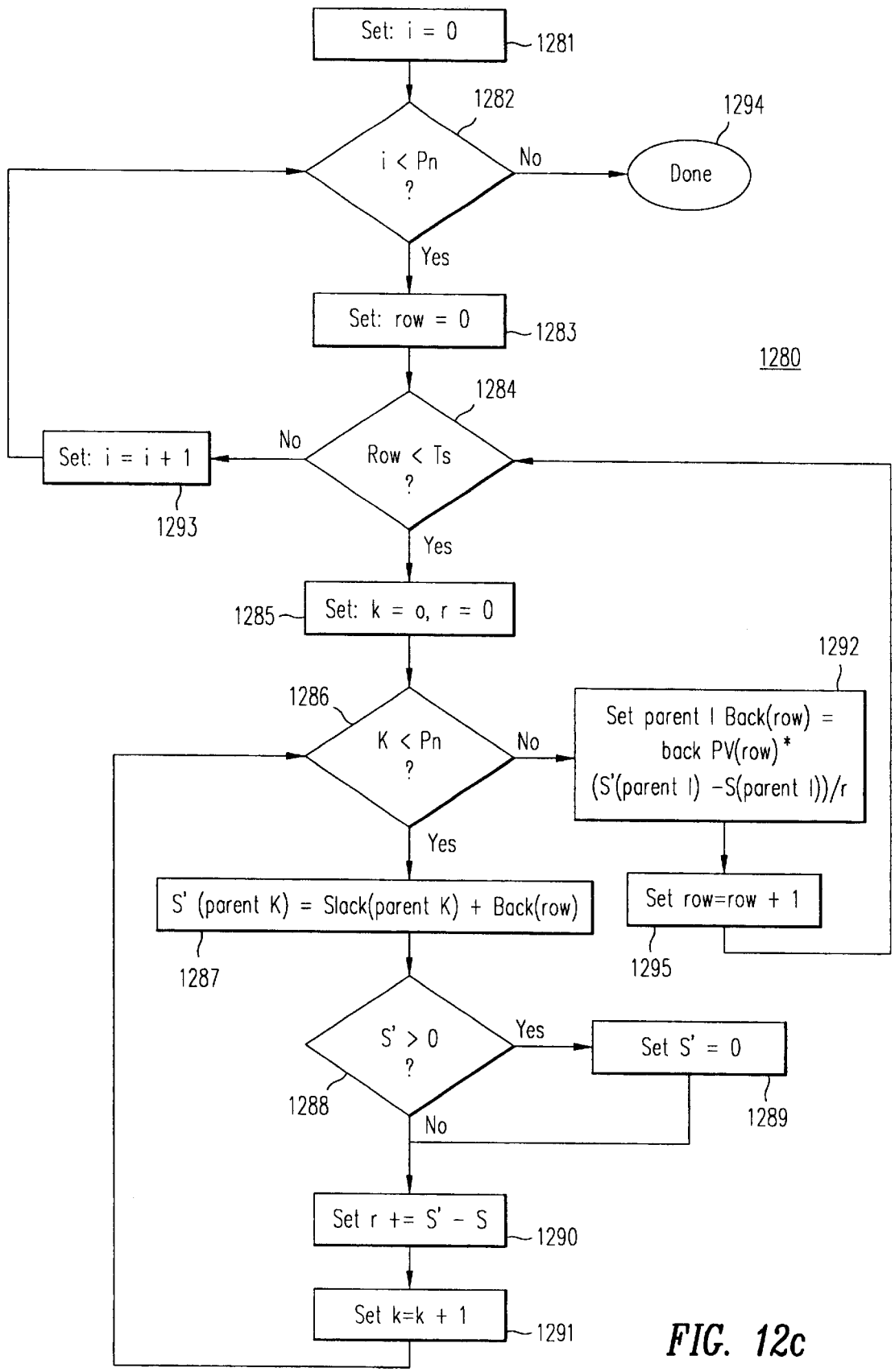
FIG. 12c shows a flow diagram 1280 that sets forth the steps for backward propagation of values of a PV table to a divergence point.
Figure 13A:
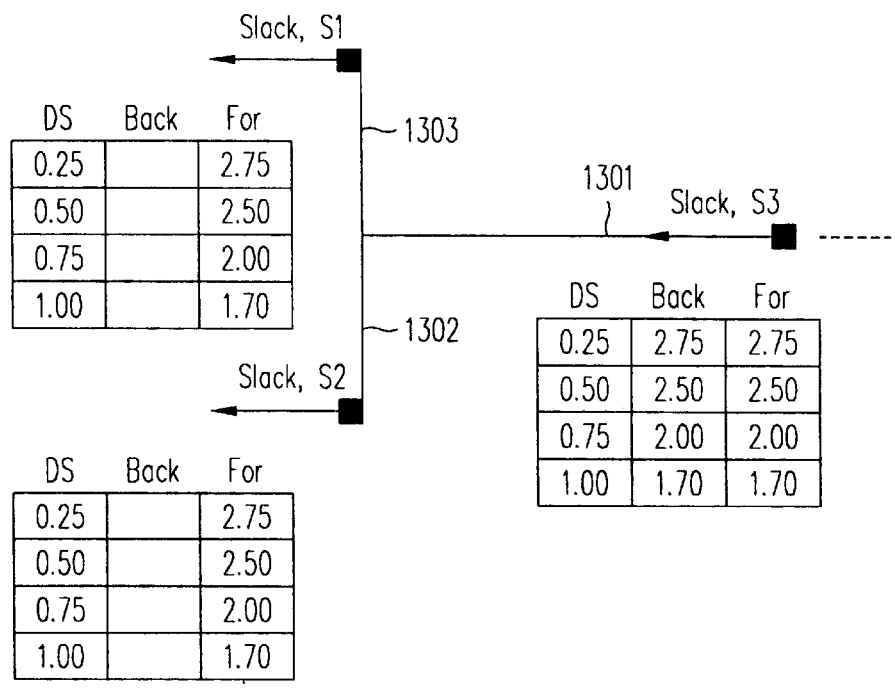
FIG. 13a shows backward propagation of PV values over a parasitic model that is driven by multiple input terminals.

FIG. 12c shows a flow diagram 1280 that illustrates the steps for backward propagation of values of a PV table to a divergence point. As shown in FIG. 12c, at step 1281, a running index i is initialized to zero. Index i indicates the current input terminal of the parasitic model or the cell instance ("parent") whose column 2 of the PV table is to be filled. For example, if the parasitic model has three input terminals, then index i runs from 0 to 2. Steps 1282, 1283 and 1284 step through each input terminal of a parasitic model or a cell instance to fill in the rows of the PV table of the input terminal one by one. For each row to be propagated from the PV table of the output terminal of parasitic model or cell, the slacks of other input terminals of the parasitic model or cell are also considered. Index k, which is initialized at step 1285, is another running index for traversing the same input terminals of the cell instance or parasitic model. Thus, at step 1285, PV(row, 2) (i.e., the current row in the PV table of the current input terminal) is initialized to zero. For each input terminal k (kept track of by step 1286), the slack s(k) of input terminal k and PV(row, 1) of output terminal k times PI are summed to provide an improved slack s' (k) (step 1287). If the improved slack s' (k) exceeds 0, the improved slack s' (k) is set to 0 (steps 1288 and 1289). The total slack improvement r (i.e., r=s'−s) is obtained by accumulating (step 1290) the slack improvements of all input terminals. At step 1292, PV(row, 2) of input terminal i provided the ratio of its slack improvement to the total slack improvement r (i.e., (s' (i)−s(i))/r). Thus, PV(row, 2) represents a measure of the relative contribution of slack improvement among the input terminals, given the propagated PV(row, 2) of the output terminal.

Figure 12D:
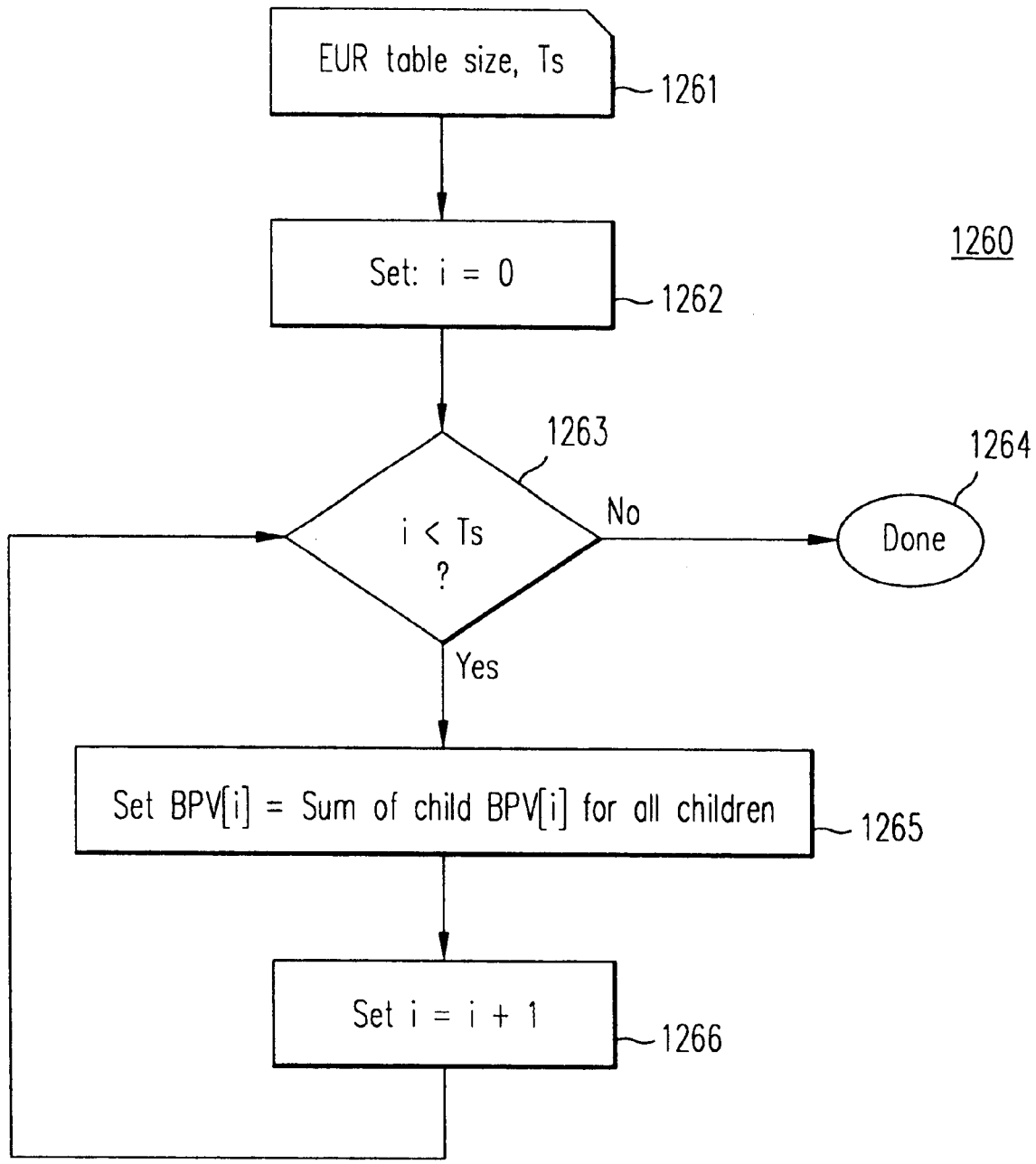
FIG. 12d shows a flow diagram 1260 that illustrates the steps for backward propagation of values of a PV table to a merged point.

FIG. 12d shows a flow diagram 1260 that illustrates the steps for backward propagation of values of a PV table to a merged point. As shown in flow diagram 1260, for row: i of the PV table of the input terminal of the cell instance or parasitic model, entry PV(i, 2) is assigned the sum of all corresponding PV(i, 2) in the PV tables of the output terminals ("children") of the cell instance or parasitic model, as steps 1263, 1265 and 1266 iterate over all rows of the PV table of the input terminal of the cell instance or parasitic model.

Figure 14A:
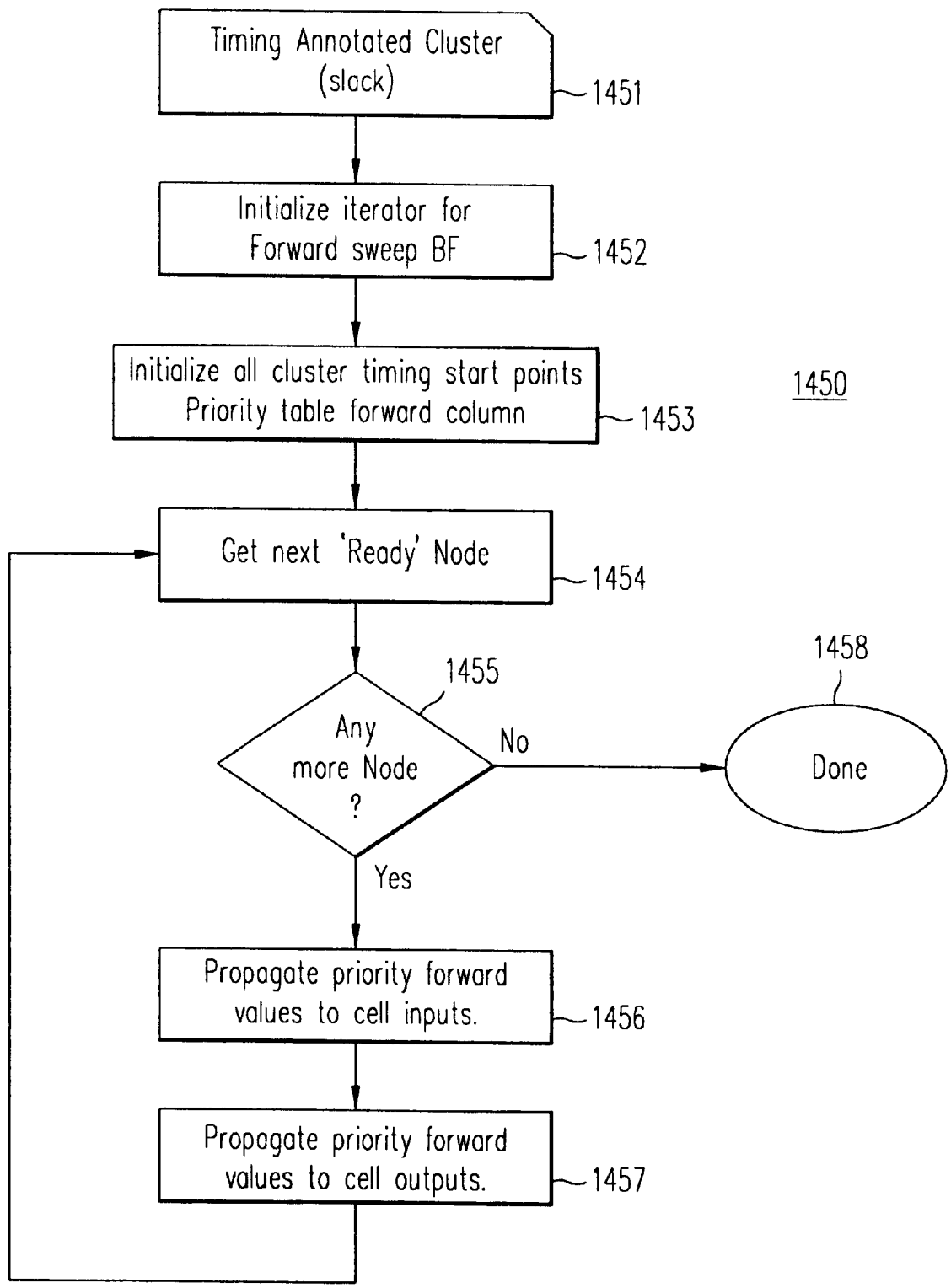
FIG. 14a is a flow diagram 1450 showing forward propagation of PV values at step 1009 of FIG. 10.
Figure 14B:
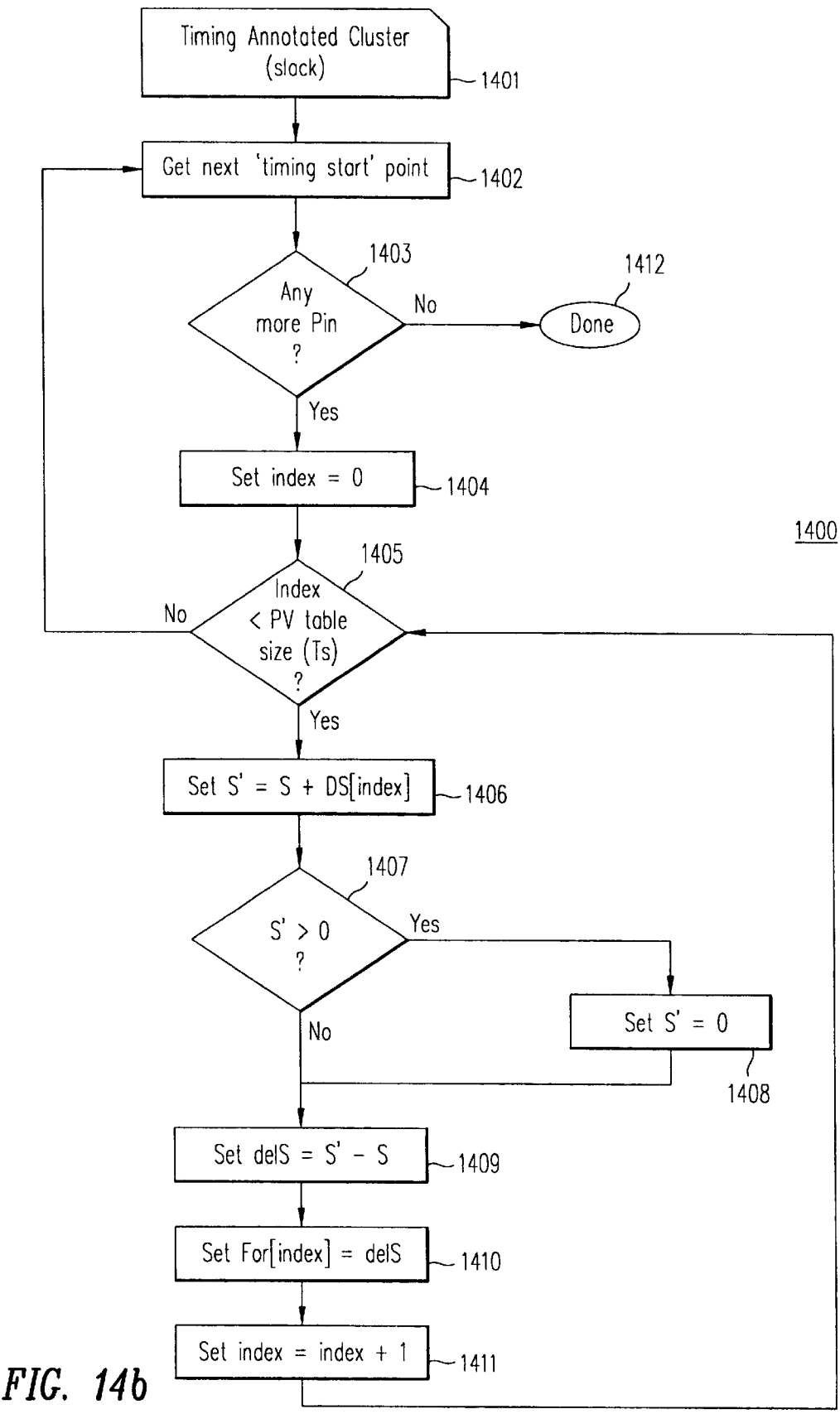
Figure 14C:
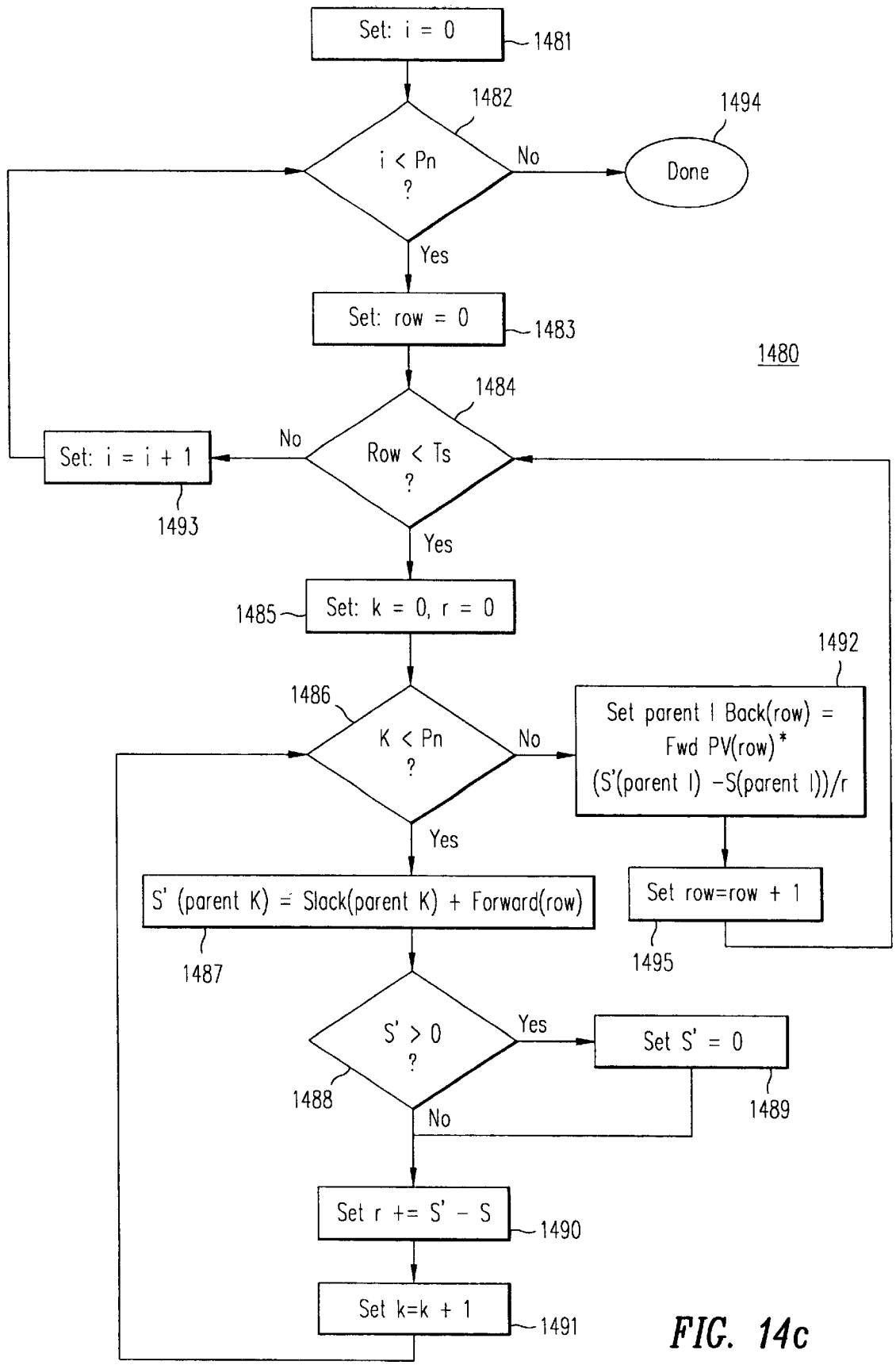
FIG. 14c shows a flow diagram 1480 that sets forth the operations for forward propagation of values of a PV table to a divergence point.
Figure 14D:
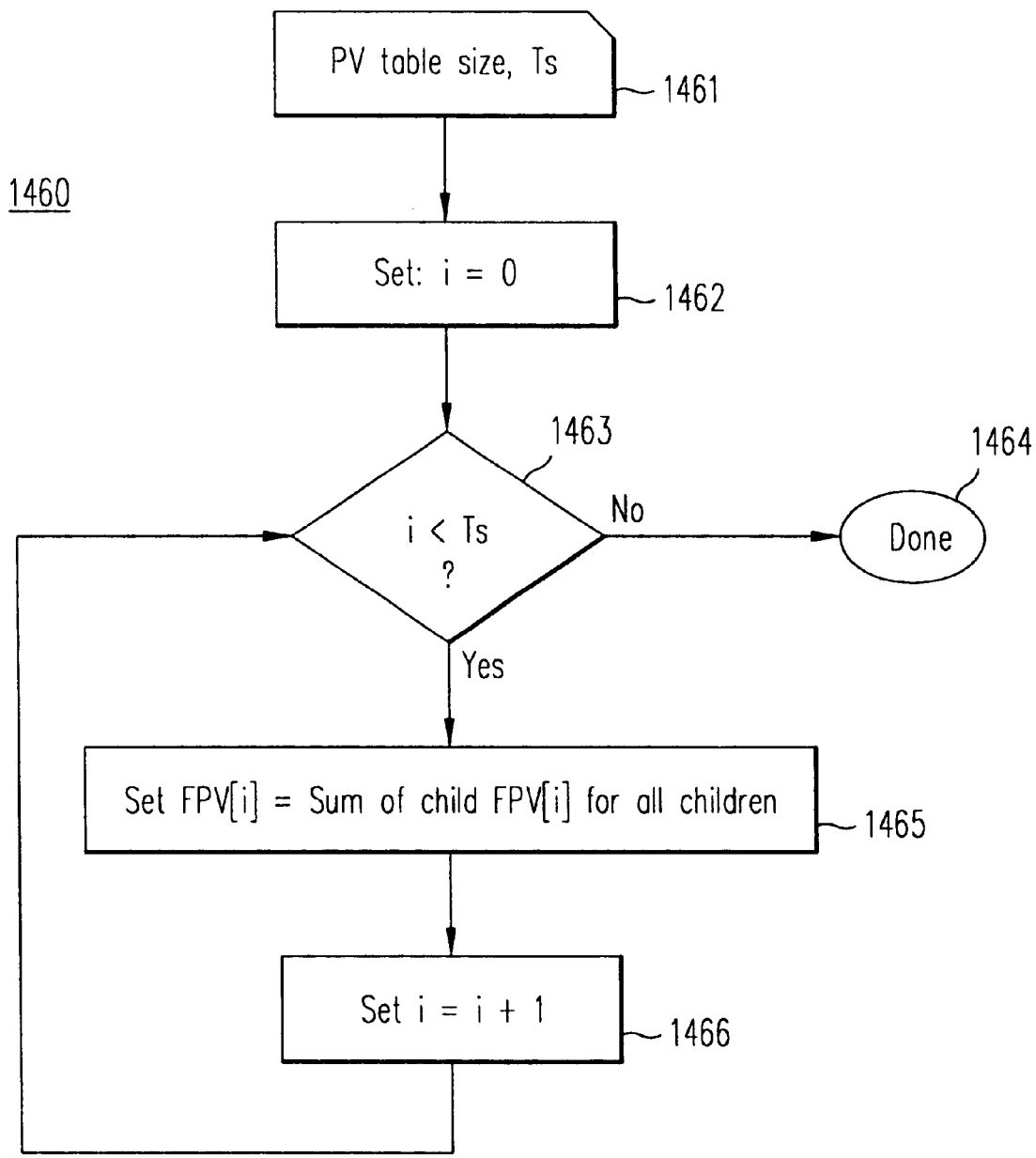
FIG. 14d shows a flow diagram 1460 that illustrates the steps for forward propagation of values of a PV table to a merged point.

Forward propagation of PV values step 1009 of FIG. 10 is illustrated by flow diagram 1450 of FIG. 14a. In this embodiment, forward and backward propagation steps are substantially identical. Thus, flow diagram 1450 of FIG. 14a is substantially identical to flow diagram 1250 of FIG. 12a. To avoid repetition, a detailed description of flow diagram 1450 is omitted. For the same reason, the descriptions of the following flow diagrams are also omitted: (a) flow diagram 1400 of FIG. 14b, which illustrates forward column initialization step 1453 of FIG. 14a; (b) flow diagram 1460 of FIG. 14c, which illustrates forward propagation of PV values to a divergence point; and (c) flow diagram 1460 of FIG. 14d, which illustrates forward propagation of PV values to a merge point.

Figure 13B:
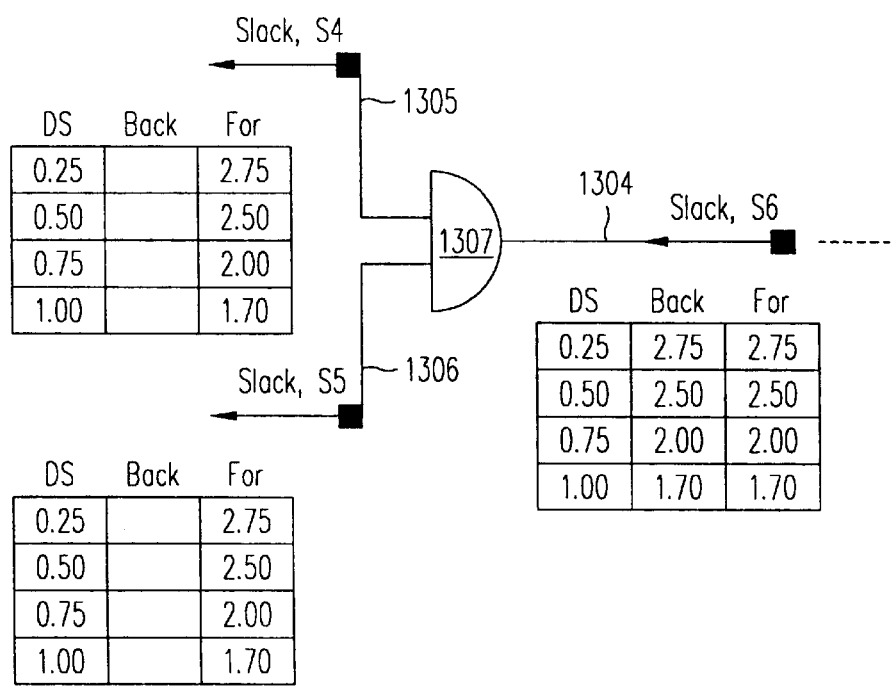
FIG. 13b shows backward propagation of PV values over a cell instance having multiple input terminals.
Figure 13C:
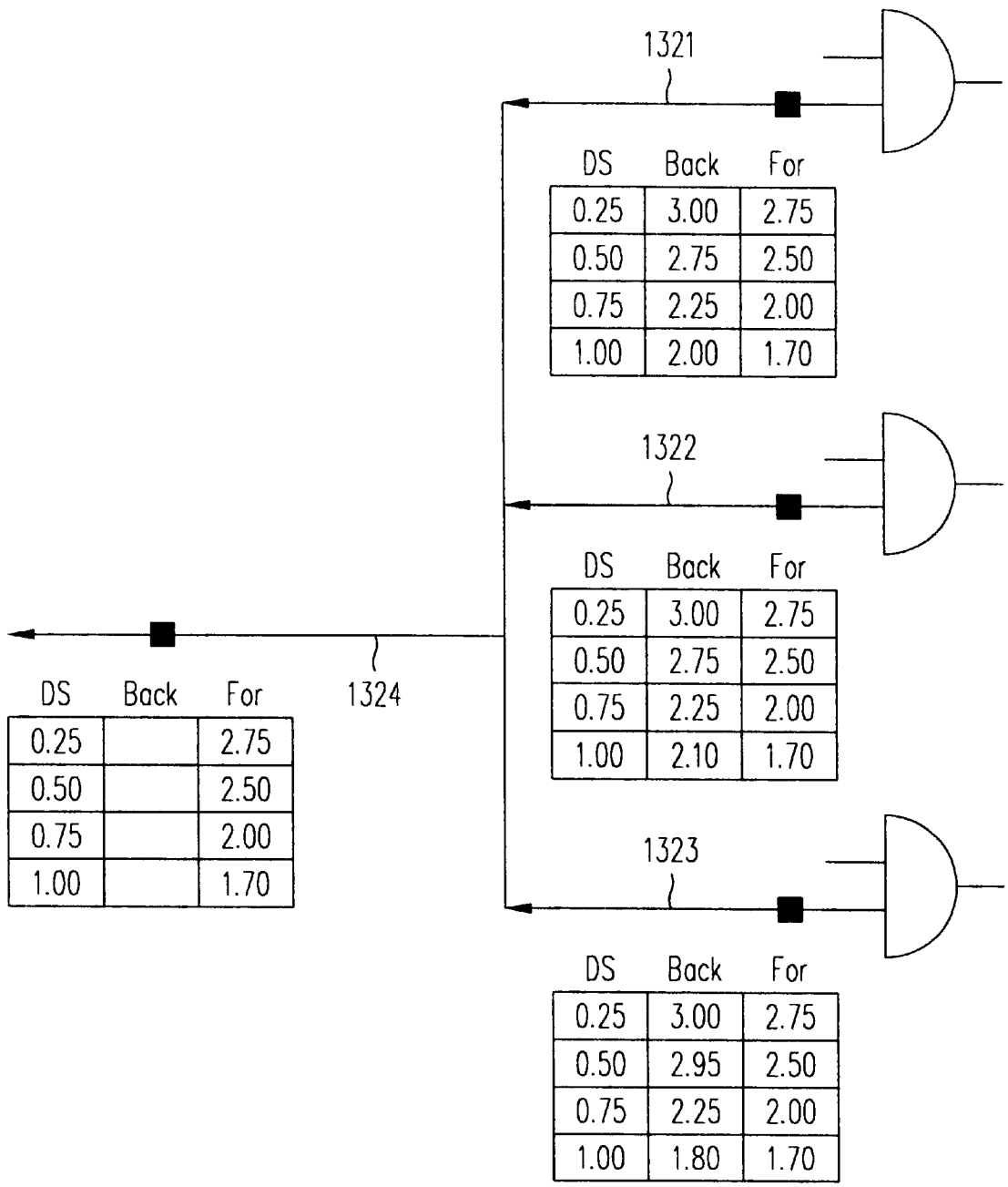
FIG. 13c shows backward propagation of PV values from multiple output terminals of a parasitic model to a single input terminal.
Figure 15A:
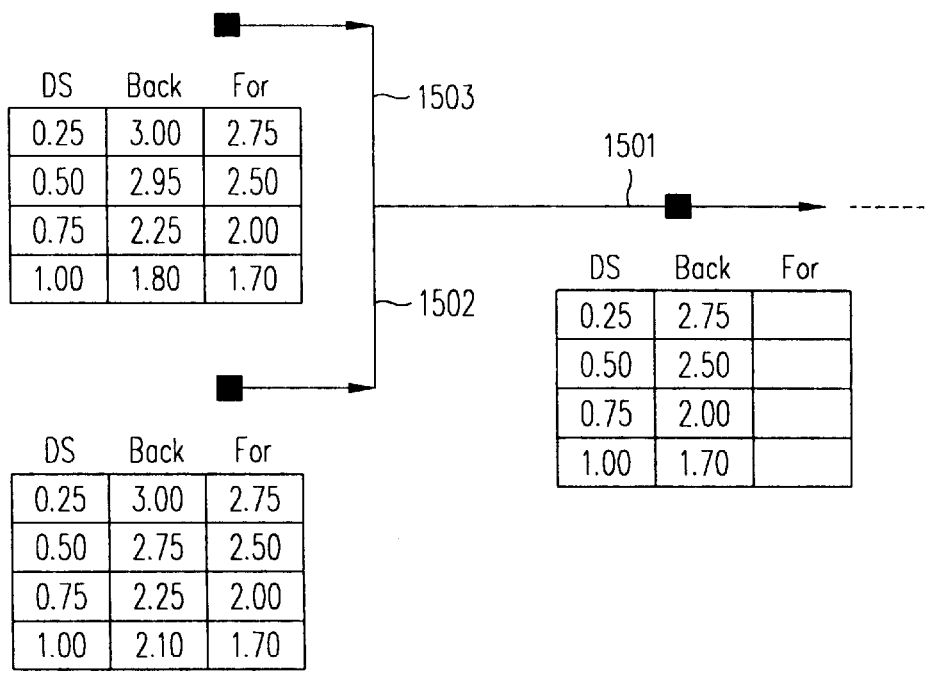
FIG. 15a shows forward propagation of PV values over a parasitic model that is driven by multiple input terminals.
Figure 15B:
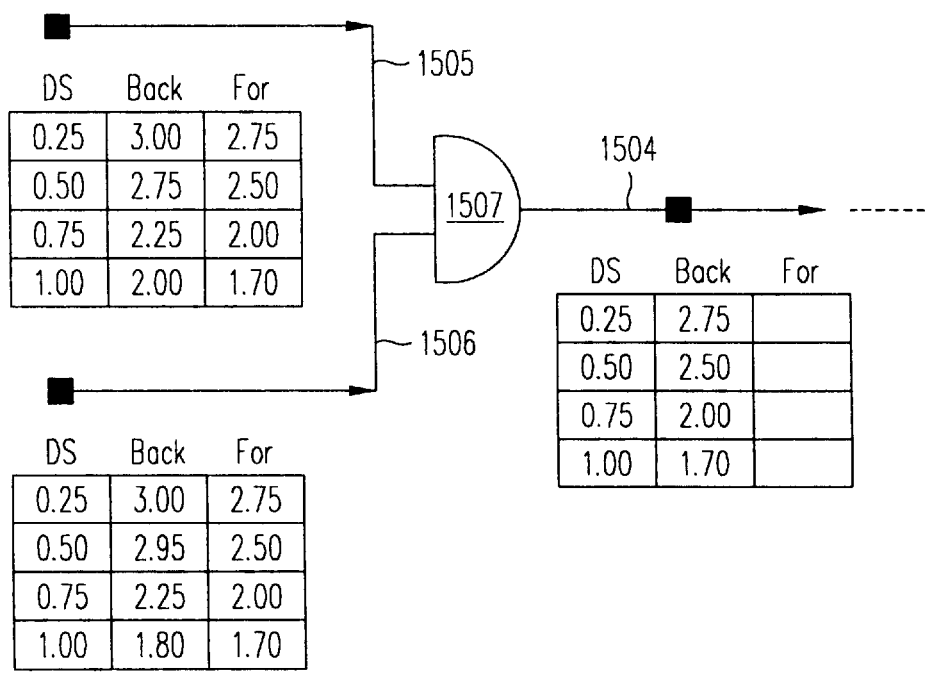
FIG. 15b shows forward propagation of PV values over a cell instance having multiple input terminals.
Figure 15C:
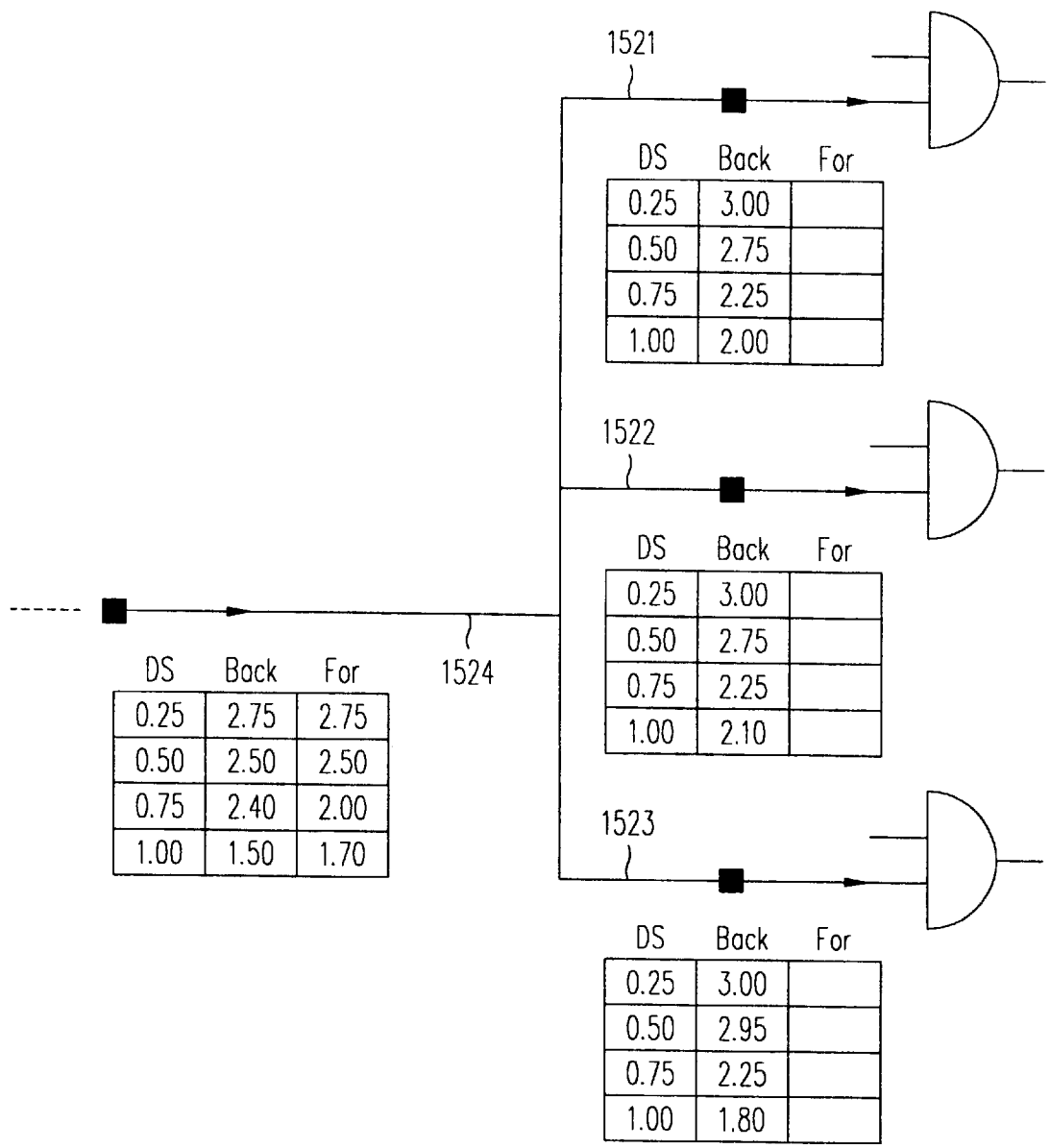
FIG. 15c shows forward propagation of PV values from a single input terminal of a parasitic model to multiple output terminals.

Similarly, the examples of divergence points and merged points in FIGS. 15a, 15b and 15c, which are substantially similar to FIGS. 13a, 13b and 13c above (except for the direction of propagation) are also not described to avoid excessive repetition. FIGS. 15a, 15b and 15c illustrate, respectively, forward propagation (a) when a parasitic model is driven by multiple input terminals, (b) when an output terminal of a cell instance has multiple input terminals, and (c) from multiple input terminals of a parasitic model to a single output terminal ("merge point").

Figure 16:
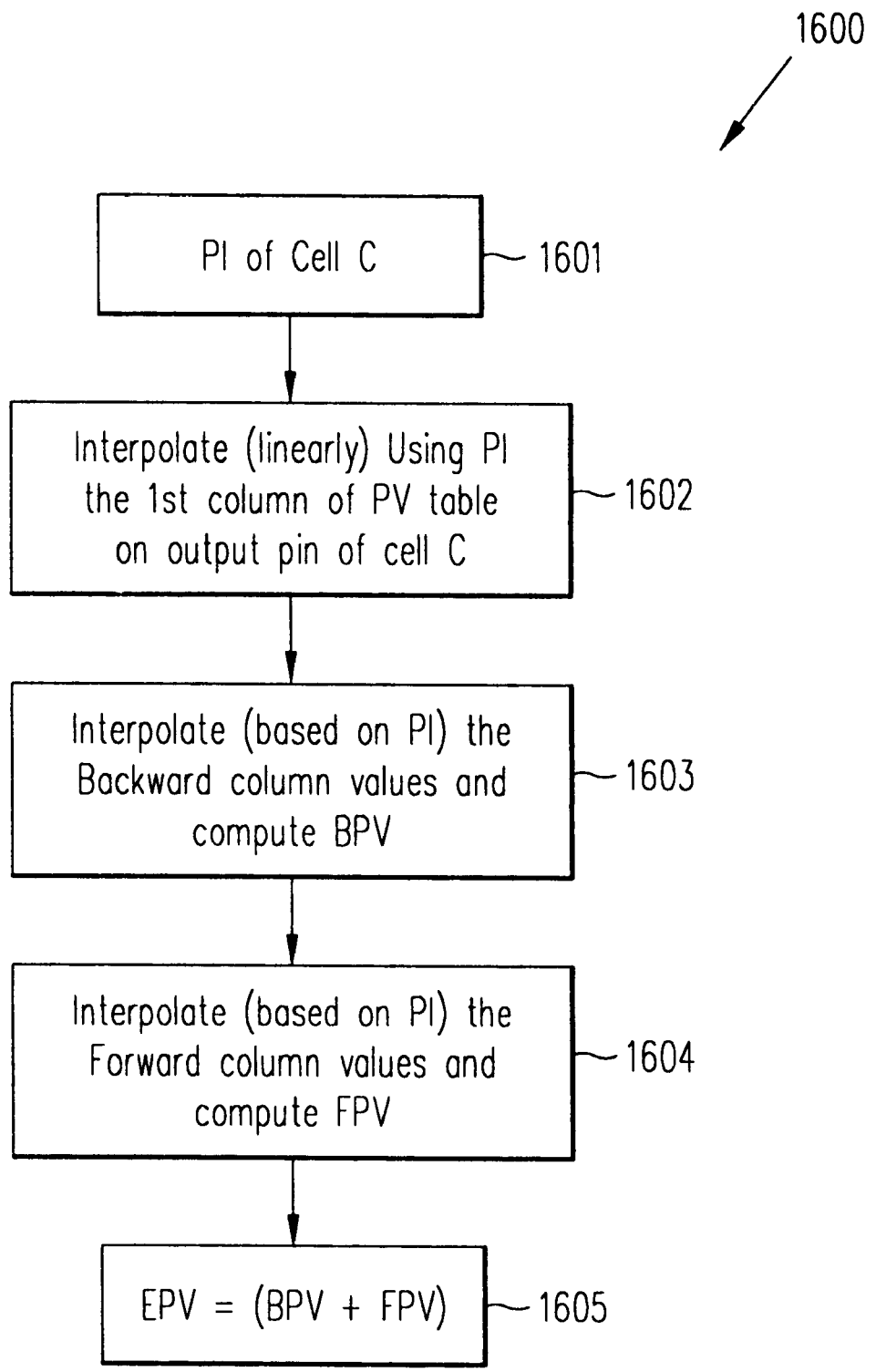
FIG. 16 shows flow diagram 1600, which illustrates the steps for computing EPV for each cell in the cluster.

As discussed above with respect to FIG. 10, subsequent to forward propagation of values in the PV tables in step 1010, EPV values are computed. FIG. 16 shows flow diagram 1600 that illustrates the steps for computing EPV for each cell in the cluster. As shown in FIG. 16, at step 1601, the PI of a cell instance C is identified. From column 1 of the PV table of each output terminal of cell instance C, at step. 1602, the value PI is used to identify two rows containing the closest values to PI. A backward PV ("BPV") value is then obtained by interpolation between corresponding PV values in column 2 of the PV table of the output terminal. Similarly, at step 1603, a forward PV ("FPV") value is obtained by interpolation between PV values in column 3 of the PV table. At step 1605, the EPV for the output terminal of cell instance C is provided by the product of PI and the sum of BPV and FPV (i.e., EPV=BPV+FPV). Subsequent to computing EPV for all cell instances, the cell instances of the cluster are ranked in decreasing EPV order, as discussed above, at step 1011 of FIG. 10.

Figure 17:
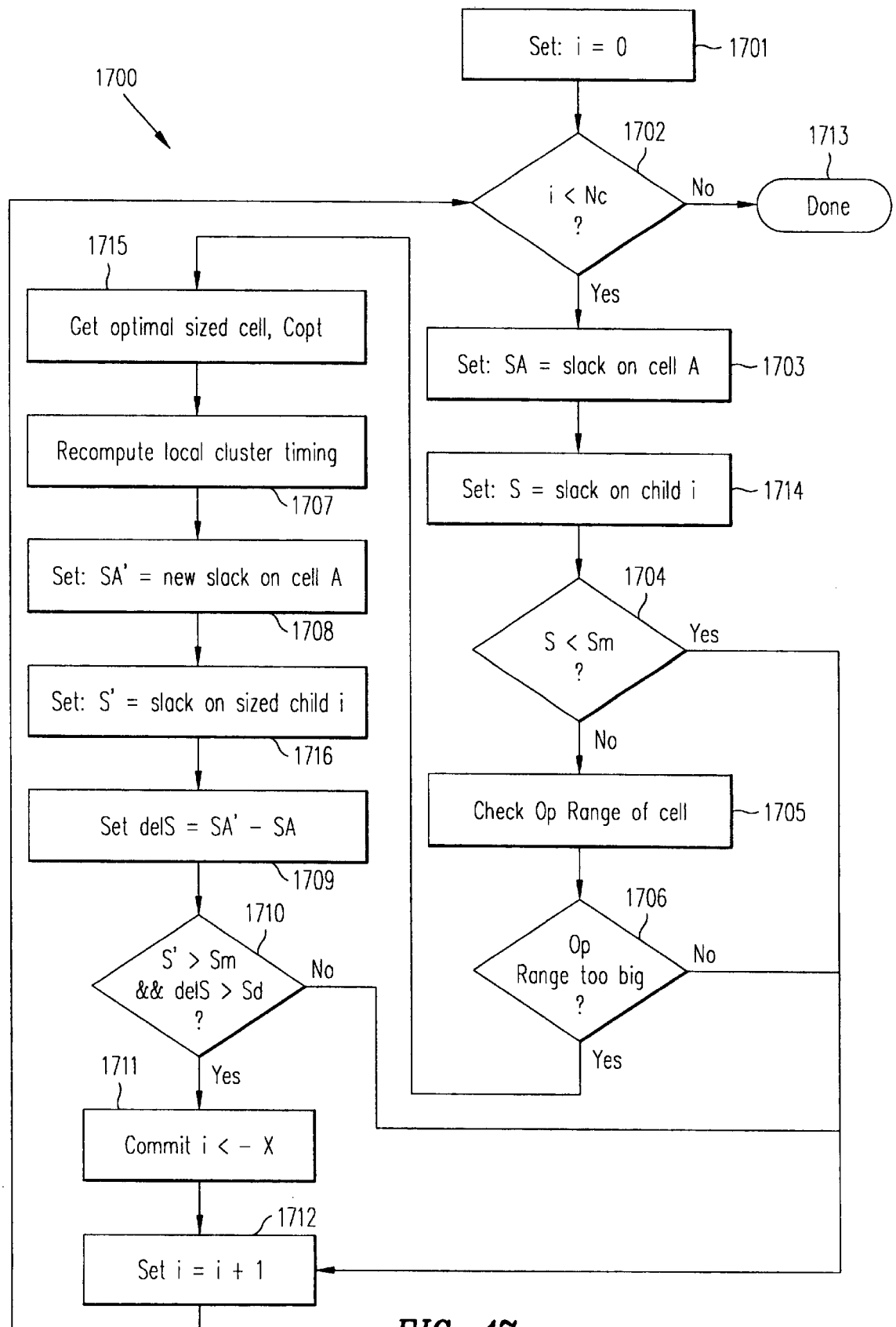
FIG. 17 shows flow diagram 1700, which illustrates the operations for optimization step 907 (i.e., cell downsizing).

Returning to FIG. 9a, using the operating ranges computed for the cells of the standard cell library above, optimization steps 907, 908 and 909 in this embodiment apply, when appropriate, to downsizing, upsizing and node-offloading operations, respectively. FIG. 17 shows flow diagram 1700, which illustrates the steps for optimization step. 907 (i.e., cell downsizing). As shown in flow diagram 1700, at steps 1701 and 1702, the cell instances ("children") driven by a driver cell instance A are examined one by one. Slacks SA and S denote the slacks at output terminals of driver cell instance A and at child instance i, respectively (steps 1703, and 1714). The running index i keeps track of which of children cell instance is being examined. If the slack S of child cell instance i (i.e., the slack on the output terminal of child cell instance i) is less than a predetermined threshold value $S_m$ (step 1704), no further action on child cell i is performed. The running index i is incremented at step 1712 to select the next child cell instance. Otherwise, slack S of child cell instance i is greater than threshold value $S_m$, the operating range of child cell instance i is checked (step 1705). If the load driven by cell instance i is not within cell instance i's operating range, cell instance i is replaced by an instance of a cell $C_{opt}$ of the function group of cell instance i (step 1715). Otherwise, i.e., if the load driven by cell instance i is within cell instance i's operating range, no further action is taken with respect to cell instance i. The running index i is incremented at step 1712 to select the next child cell instance.

After replacement at step 1715 by an instance of cell $C_{opt}$, STA 308 is called at step 1707 to recompute timing in the local cluster. The recomputed slacks SA' and S' of driver cell instance A and replaced cell instance i are calculated at steps 1708 and 1716, respectively. A timing improvement in driver cell instance A, denoted by $\Delta S = SA' - SA$, is computed at step 1709. If S' exceeds $S_m$ and $\Delta S$ exceeds a predetermined minimum slack amount $S_d$, substitution of cell instance i by the instance of cell $C_{opt}$ is made permanent (step 1711). The process returns to step 1702 for the next child cell instance, until all children cell instances are considered.

Figure 18:
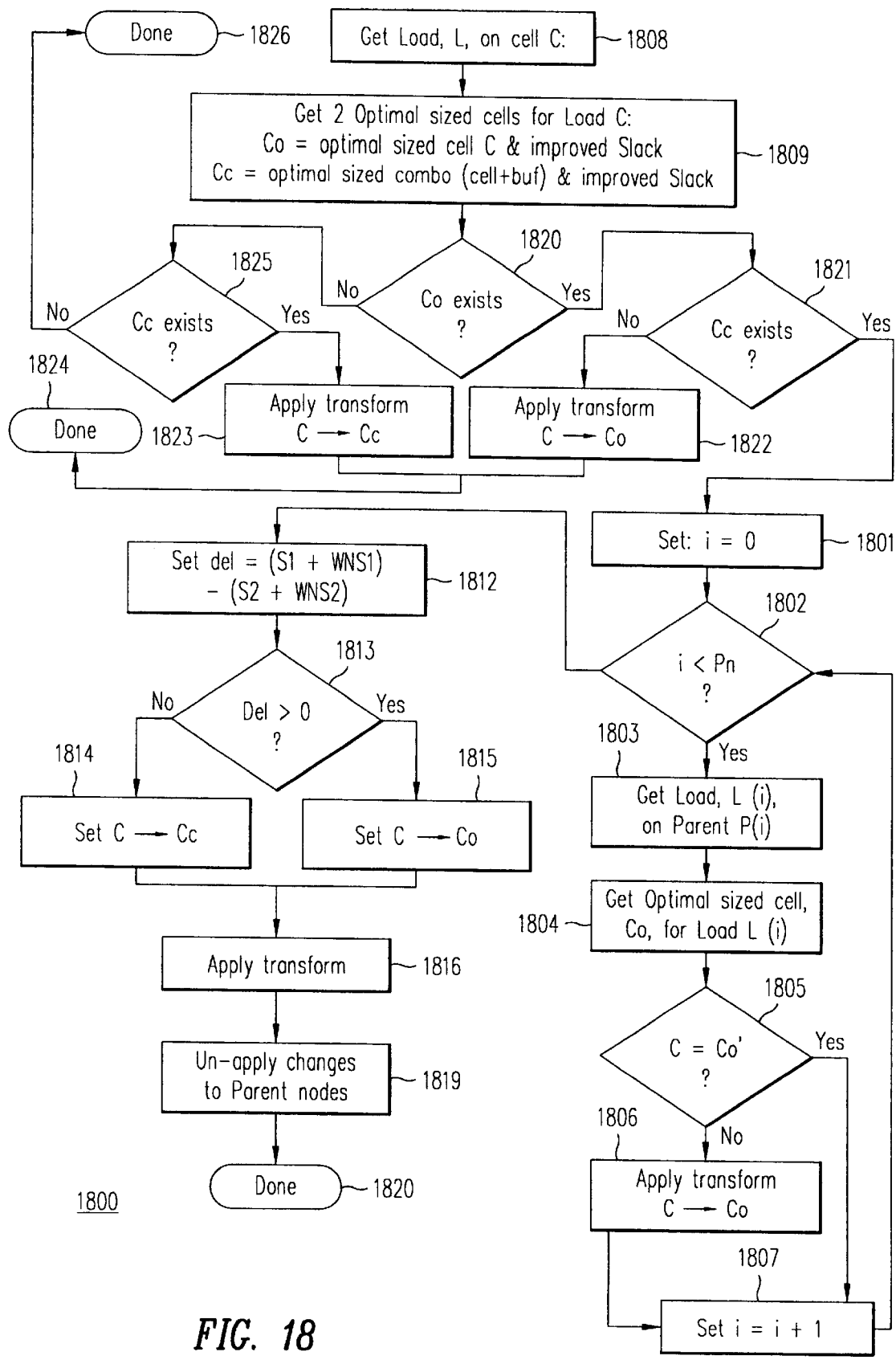
FIG. 18 shows flow diagram 1800, which illustrates the operations for optimization step 908 (i.e., cell upsizing).

FIG. 18 shows flow diagram 1800, which illustrates the operation of optimization step 908 (i.e., cell upsizing). As shown in flow diagram 1800, at steps 1809, 1820, 1825 and 1821, for a given cell instance C with an output load of L, the cell library is searched to determine whether there exists (i) an optimal cell $C_o$ in the same function group as cell instance. C with an operating range encompassing load L and (ii) a combination $C_c$ within the same function group as cell instance C and buffer having an operating range encompassing load L (steps 1808–1809). If neither optimal cell $C_o$ nor combination $C_c$ exists, no transformation is available (step 1826). Otherwise, if only one local transformation is available (i.e., if either optimal $C_o$ or combination $C_c$ exists, but not both exist), the local transformation is applied (steps 1822 and 1823).

However, if both transformations are available (i.e., if both optimal $C_o$ and combination $C_c$ exists), steps 1801–1807 first examine every cell instance ("parent cell instance") $C_p$ that drives an input terminal of cell instance C. Running index i, which is initialized at step 1801, indicates which parent cell instance is currently under consideration. At step 1803, the load $L_i$ driven by each parent cell instance $C_p$ is examined to determine if load $L_i$ is within the optimal operating range of parent cell instance $C_p$ (steps 1803–1806). If the load is not within the optimal operating range of parent cell instance $C_p$, an optimal cell $C_o'$ is identified and substitutes for cell instance $C_p$. The process returns to step 1802 until all parent cell instances are examined.

Then, at step 1812, the following quantities are computed: (i) the sum $S_o$ of worst negative slack WNS1 at the input terminals of cell instance C and "delta" slack S1 (i.e., the slack between the input terminal of cell instance C having the worst negative slack and the output terminal of cell instance C), on the basis of an instance of cell $C_o$ substituting for cell instance C; (ii) the sum $S_c$ of worst negative slack WNS2 and delta slack S2, on the basis of an instance of $C_c$ substituting for cell instance C; and (iii) the difference $\Delta S$ between $S_o$ and $S_c$. $S_o$ represents the slack at the output terminal of cell instance $C_o$, if cell $C_o$ substitutes in cell instance C. Similarly, $S_c$ represents the slack at the output terminal of the instance of combination $C_c$, if that instance of combination $C_c$ substitutes for cell instance C. The difference $\Delta S = S_o - S_c$ is calculated at step 1812 to determine which of these substitutions minimizes negative slack at the output terminal (steps 1814 and 1815). If $\Delta S > 0$, then cell $C_o$ is selected to replace cell instance C (step 1815). Otherwise, combination $C_c$ is selected to replace cell instance C (step 1814). The selected transformation is applied at step 1816. The transformations made to parent nodes (i.e., step 1806) are then reversed at step 1819.

Figure 19:
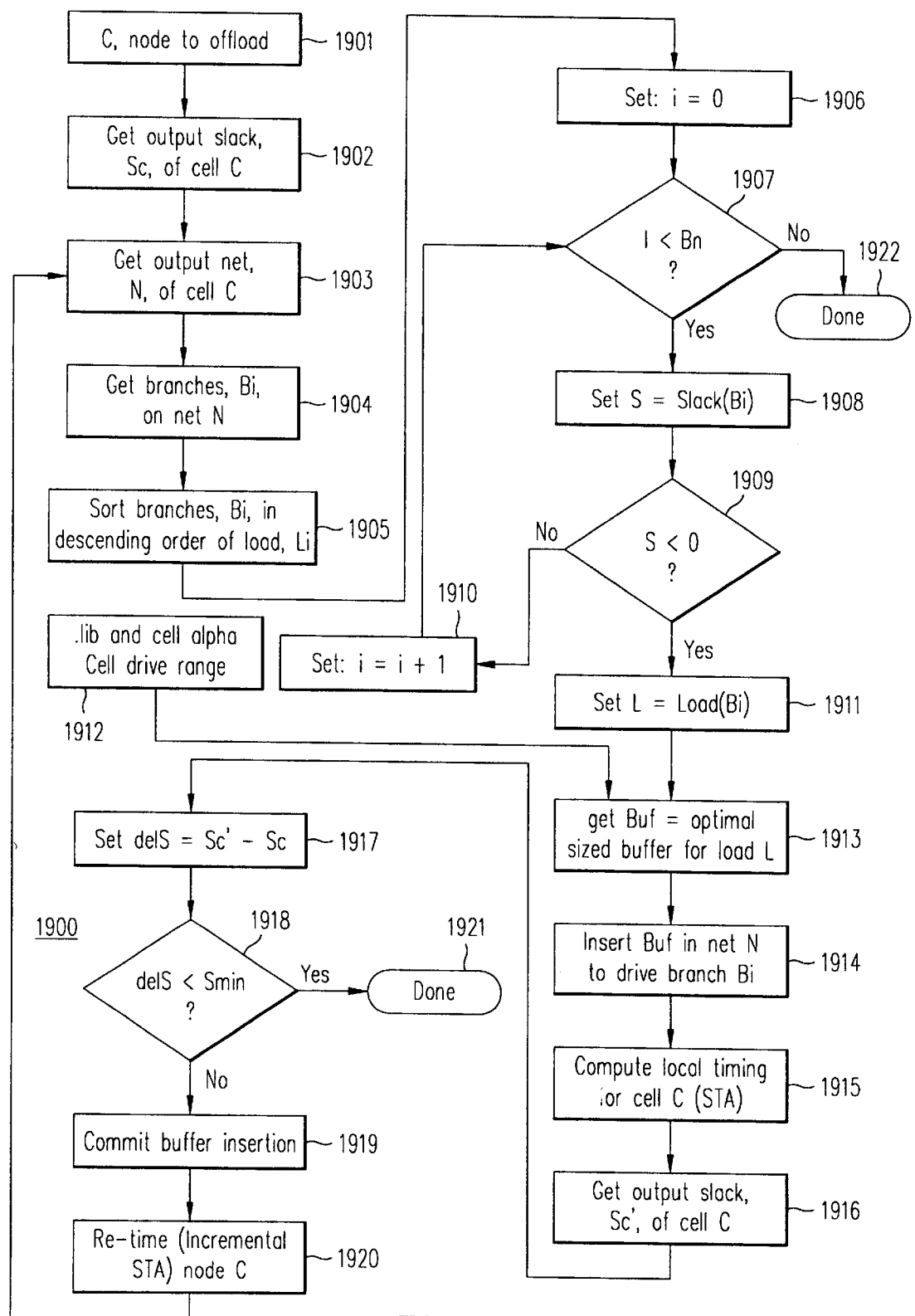
FIG. 19 shows flow diagram 1900, which illustrates the operations for optimization step 909 (i.e., node off-loading).

FIG. 19 shows flow diagram 1900, which illustrate the operations for optimization step 910 (i.e., node off-loading). Flow diagram 1900 provides for node off-loading of a cell instance C driving multiple input terminals as an output load. At steps 1902–1904, the slack $S_c$ of the output terminal of cell instance C, the topology of the net N driven by the output terminal, and the branches B on net N (i.e., the parasitic models between the output terminal of cell instance C and the input terminals of children cell instances) are obtained. At step 1905, the impedance $L_i$ of each branch of net N is computed and the resulting impedances are ranked in decreasing order of load. At steps 1907, 1908, 1909, the slack S of each branch $B_i$ (i being the running index indicating the current branch) is examined. If S is greater than or equal zero, that branch is not be off-loaded, and the process returns to step 1907. Otherwise, the cell library is searched for a buffer BUF (step 1913) whose operating range matches load value L of branch $B_i$. Timing is then recomputed at steps 1914–1916 for cell instance C to obtain an updated slack $S_c$, assuming that buffer BUF is inserted to drive branch $B_i$. A slack improvement $\Delta S = S_c - S_c$ is computed at step 1917. If slack improvement $\Delta S$ does not exceed a predetermined threshold $S_{min}$, no further processing is needed (step 1921). Otherwise, at step 1919, BUF is inserted into branch Bi and local timing at cell instance C is recomputed after the buffer insertion. The process then returns to step 1903, after an incremental timing analysis on cell instance is performed by STA 308 to determine if further optimization of net N is possible.

At step 910, STA 308 performs a static timing analysis to determine the effectiveness of the optimization steps. If timing is improved by a predetermined threshold amount, at step 911, the BCTNS algorithm of step 904 is re-run to rerank the cells in the cluster. Otherwise, i.e., timing improvement does not exceed the predetermined threshold amount, no further optimization is attempted on the present cluster. The next cluster is then selected upon return to step 903.

Figure 9B:
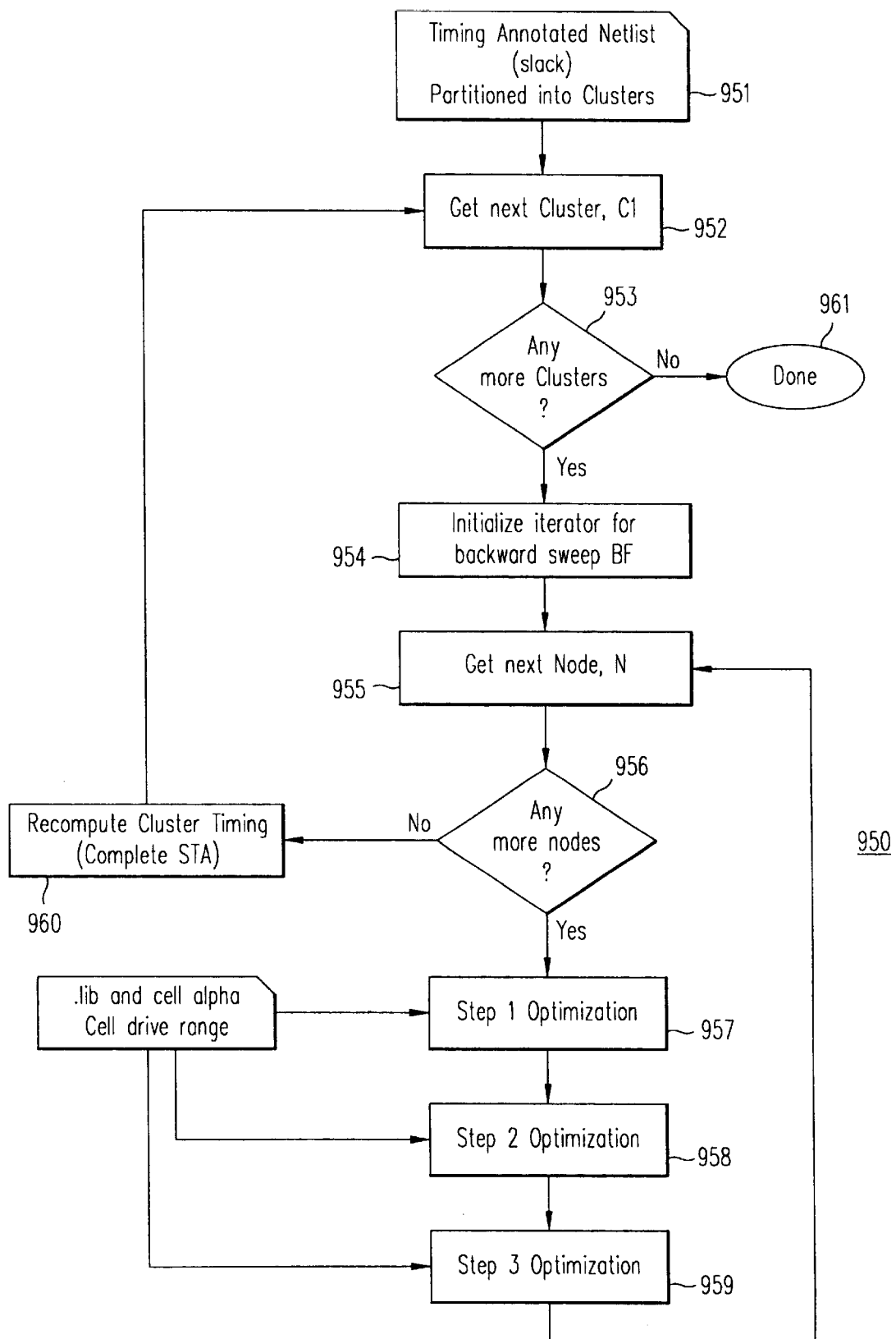
FIG. 9b is a flow diagram 900 providing an overview of the optimization steps in Phase 2B.

After all optimization steps (e.g., steps 907–909) shown in flow diagram 900 are carried out, Phase 2B optimzation steps can be run. Phase 2B is illustrated by flow diagram 950 of FIG. 9b. As shown in flow diagram 950, in Phase 2B, optimization is performed on a timing-annotated netlist partitioned into clusters (step 951). Processing is carried out cluster by cluster (steps 952, 953, 961). For each cluster, a backward sweep traverses the cluster Node by Node (steps 954–956). (As discussed above, a Node is a macro in the physical design). For each Node with a negative output slack, optimization steps 957, 958 and 959 are carried out. Steps 957, 958 and 959 are respectively substantially identical to the downsizing step 907, upsizing step 908 and node off-loading step 909 discussed above. After all Nodes in the cluster are traversed, timing in the cluster is recomputed (step 960). The process then returns to step 952 for operation on the next cluster, until all clusters are processed (step 961).

Figure 20:
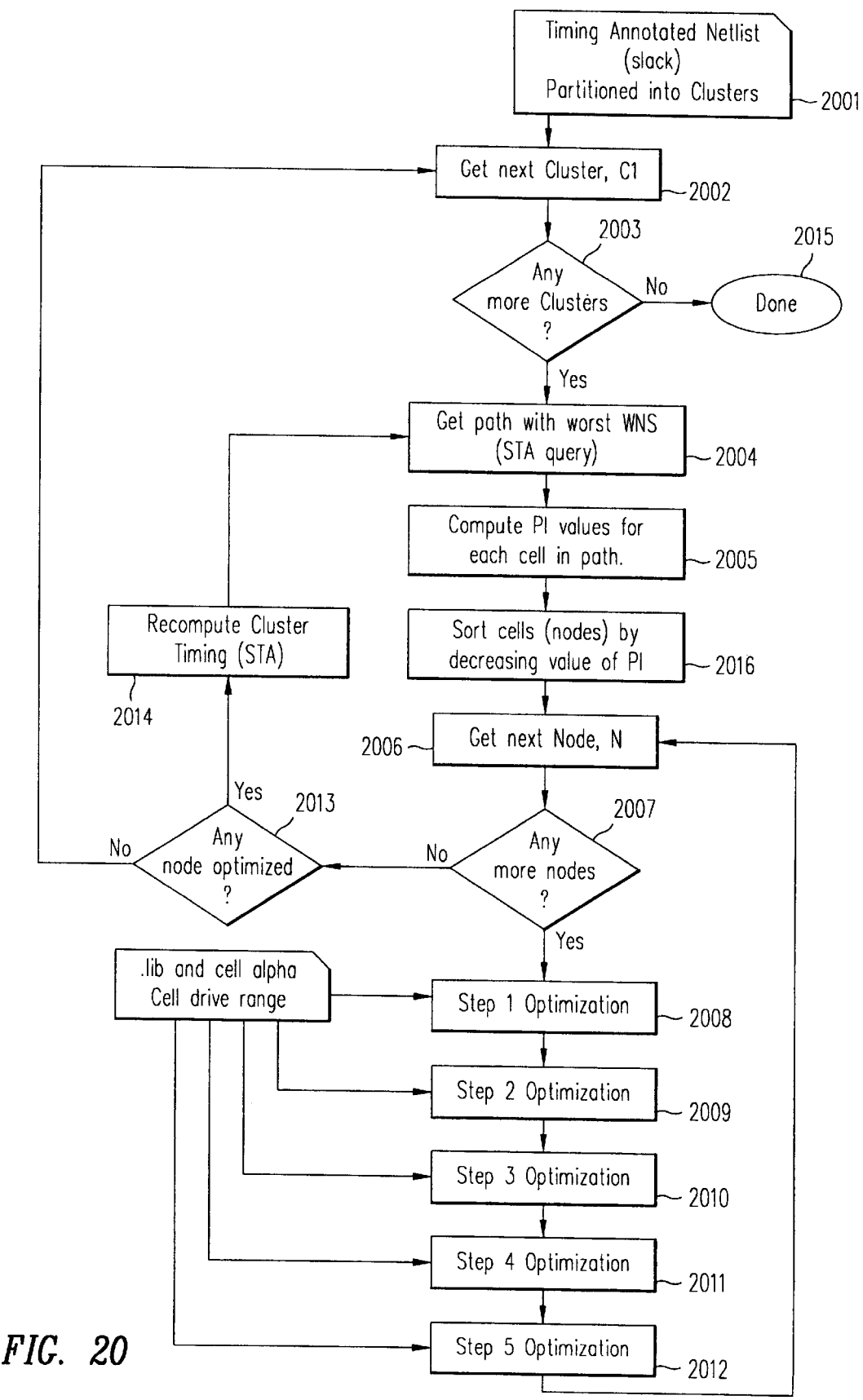
FIG. 20 is a flow diagram 2000, which provides an overview of the optimization steps in Phase 3.

Phase 3 is illustrated by flow diagram 2000 of FIG. 20. In Phase 3, as shown in flow diagram 2000, optimization is performed on a timing-annotated netlist partitioned into clusters (2001). Processing is carried out cluster by cluster (steps 2002–2003). A backward sweep traverses the identified path Node by Node and a potential improvement (PI) is calculated. The Nodes are then sorted by PI (steps 2004, 2005 and 2016). In each cluster, at step 2004, STA 308 is called to identify a path with the worst negative slack (steps 2005–2007). For each Node, optimization steps 2008–2012 are carried out. Optimization steps 2008–2010 are respectively substantially identical to the downsizing step 907, upsizing step 908 and node off-loading step 909 discussed above. Optimization steps 2011 and 2012, corresponding to optimization involving "input swapping" and "logic duplication" are discussed in further detail below. After all Nodes in the cluster are traversed, timing in the cluster is recomputed (step 2014), if a Node is optimized during the traversal of the path. The process returns to step 2004 to identify a path in the cluster having the worst negative slack. However, if no node is optimized during the last iteration within the cluster, the process returns to step 2002 for operation on the next cluster, until all clusters are processed (step 2015).

Figure 21:
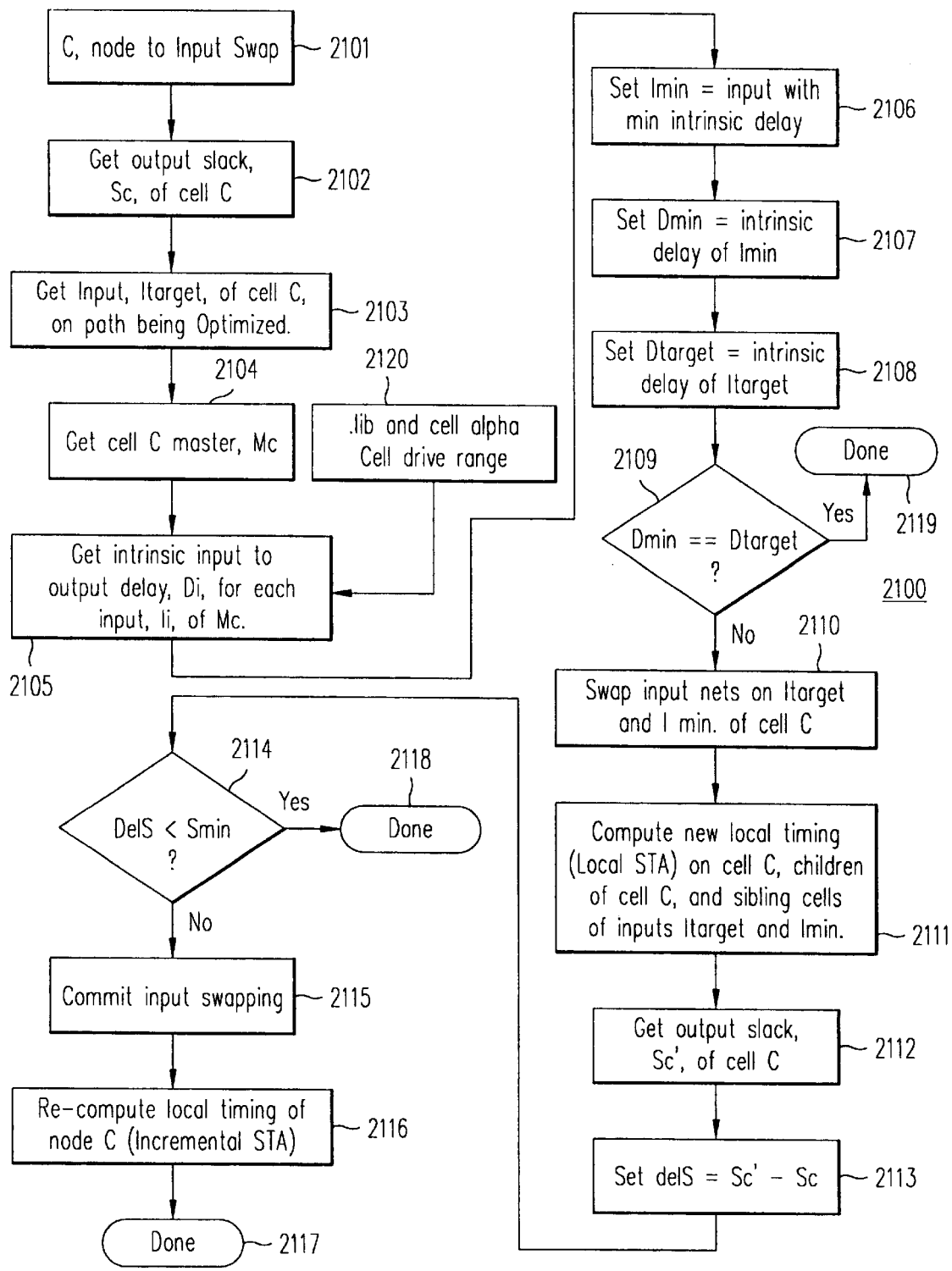
FIG. 21 shows flow diagram 2100, which illustrates "input swapping" optimization step 2011 of Phase 3.

FIG. 21 shows flow diagram 2100 which illustrates "input swapping" optimization step 2011. Input swapping optimization step 2011 examines cell instances or Nodes whose slack performance can be improved by swapping input terminals. To consider a Node C for input swapping (step 2101), the slack $S_c$ of Node C's output terminal is obtained (step 2102). An input terminal $I_{target}$ of the Node C is identified on a path that is being considered for optimization. From the cell library, intrinsic input-to-output delay $D_i$ between each equivalent input terminal of Node C and the output terminal of Node C is obtained (step 2105). The least $D_{min}$ of these input-to-output delays, which is equivalent to the input-output pin pair and corresponding to input terminal $I_{min}$, is selected. At step 2109, $D_{min}$ is compare to the intrinsic delay $D_{target}$, between input terminal $I_{target}$ and the output terminal of Node C. If $D_{min}$ substantially equals or exceeds $D_{target}$, no optimization can proceed, since swapping $I_{min}$, with $I_{target}$ does not result in a significant improvement (step 2119). The local timing on Node C, children of Node C, and other cell instances also receiving signals from input terminals $I_{target}$ and $I_{min}$ are recomputed, assuming input terminals $I_{target}$ and $I_{min}$ are swapped (steps 2110 and 2111). Under such an assumption, the slack $S_c'$ at the output terminal of Node C is recomputed. A slack improvement value $\Delta S=S_c'-S_c$ is calculated at step 2113. If $\Delta S$ is greater than predetermined threshold value $S_{min}$, input terminals $I_{min}$ and $I_{target}$ are swapped (i.e., the driver that previously drives input terminal $I_{min}$ is now coupled to drive input terminal $I_{target}$ and the driver that previously drives input terminal $I_{target}$ is now coupled to drive input terminal $I_{min}$.

Figure 22:
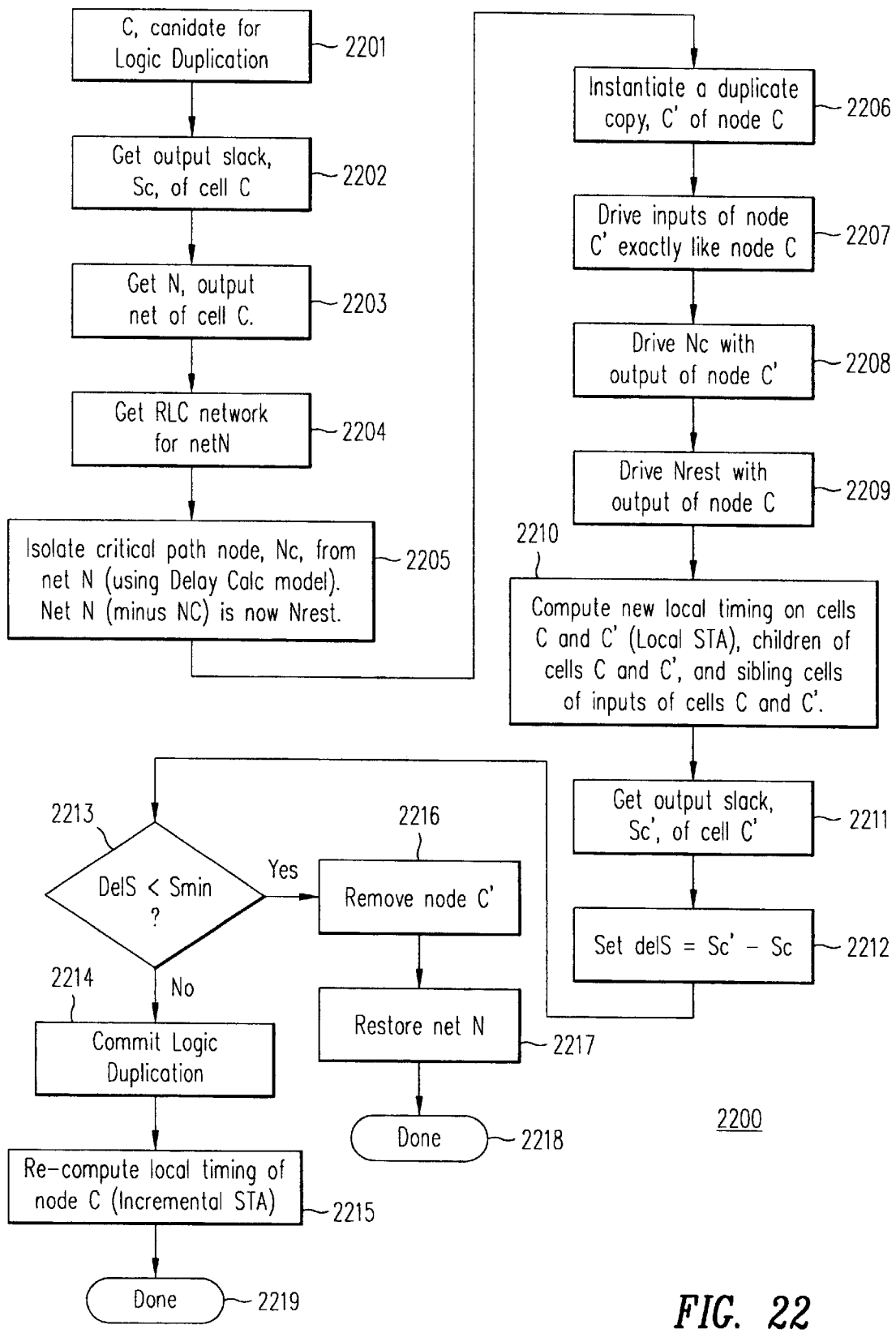
FIG. 22 shows flow diagram 2200, which illustrates "logic duplication" optimization step 2012 of Phase 3.

FIG. 22 shows flow diagram 2200 that illustrates "logic duplication" optimization step 2012 of Phase 3.

Figure 23:
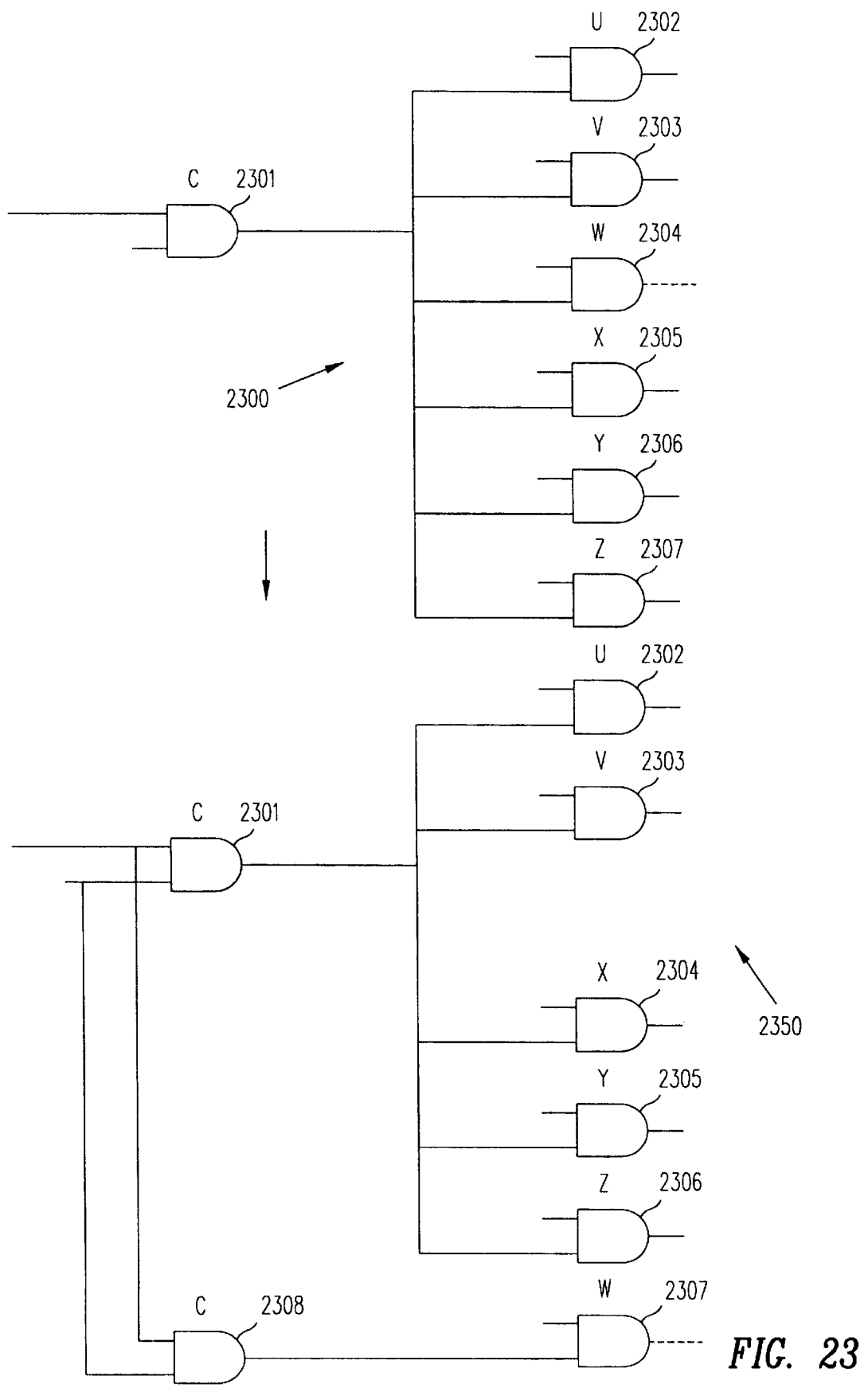
FIG. 23 provides an example of circuit optimization by logic duplication.

FIG. 23 provides an example of an optimizing step using logic duplication. As shown in FIG. 23, in logic circuit 2300, cell instance 2301 drives input terminals of cell instances 2302–2307. Logic duplication is applied to logic circuit 2300 to provide logic circuit 2350. In logic circuit 2350, an additional cell instance 2308, which is identical to cell instance 2301, is provided. Cell instance 2308 is driven by the same input signals as cell instance 2301. Cell instance 2308, however, drives cell instance 2307, which is severed from the output terminal of cell instance 2301. If cell instance 2307 is a cell in a critical path, by duplicating cell instance 2301 in cell instance 2308 and appropriately sizing cell instance 2308, the signal delay in the critical path can be reduced.

As shown in flow diagram 2200, for each cell instance C considered for logic duplication (step 2201), the slack $S_c$ at the output terminal of cell instance C and the parasitic network representing the net N at the output terminal of cell instance C are obtained (steps 2202–2204). Using STA 308, a critical path Node $N_c$ can be identified. At step 2205, a circuit topology can be created in which Node $N_c$ is severed from net N. A new cell instance C', which is an instance in cell instance C's function group is then provided in this new circuit topology to drive $N_c$ (steps 2207–2208). At step 2210, local timing is then computed for this new circuit topology, which includes cell instances C and C', their "children" cell instances, and "sibling cell instances" (i.e., cell instances sharing common input terminals with cell instances C and C'). After local timing is computed, at step 2211, the slack $S_c'$ at the output terminal of cell C' is calculated (step 2211). A slack improvement value $\Delta S=S_c'-S_c$ is calculated at step 2212. If $\Delta S$ is less than predetermined threshold value $S_{min}$ (step 2213), no modification of net N is performed (steps 2216 and 2217). Otherwise, the new circuit topology replaces net N. Local timing is then recomputed (step 2215).

Figure 24:
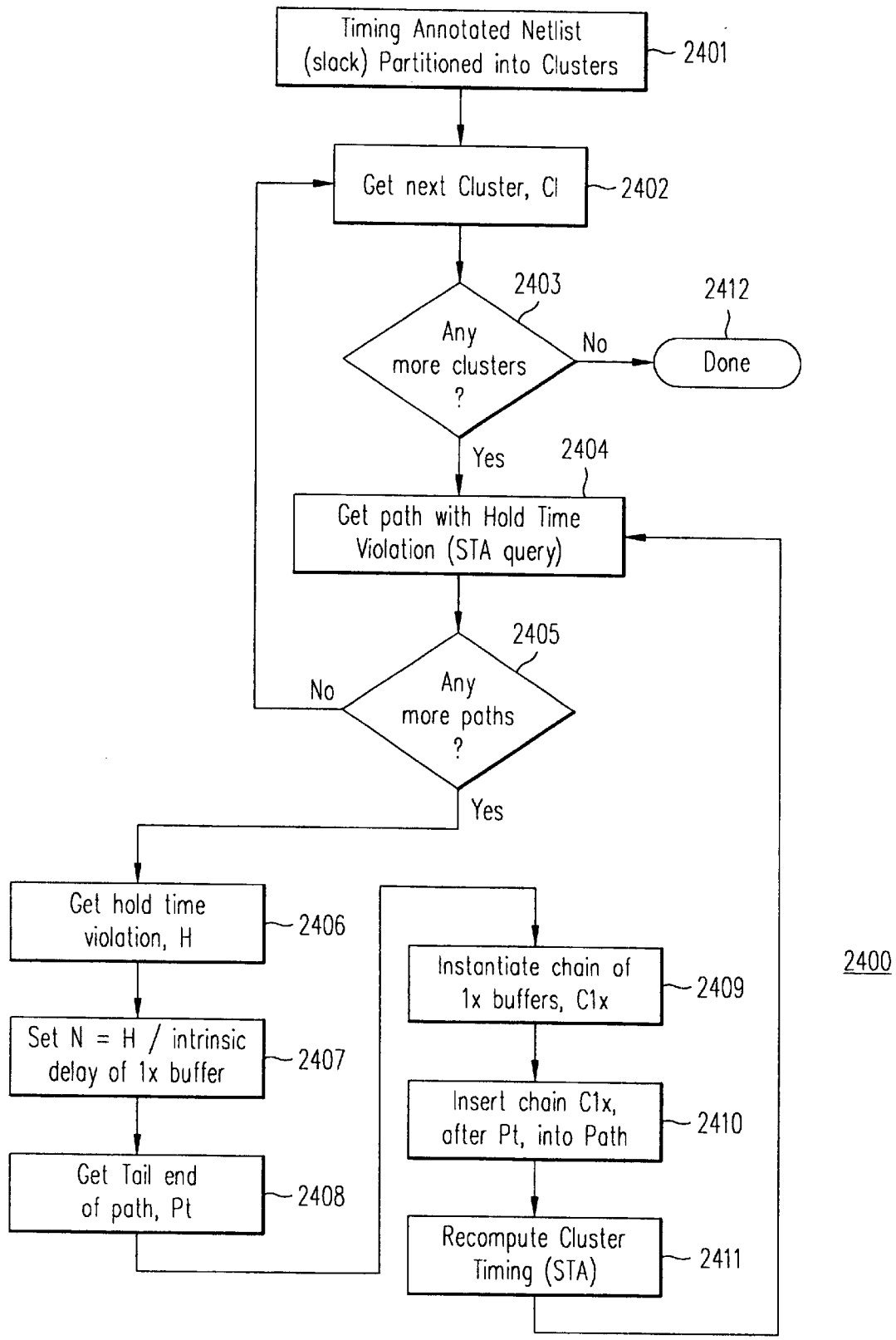
FIG. 24 shows flow diagram 2400, which illustrates a buffer insertion technique for addressing hold time violations.

While Phases 1, 2 and 3 described above optimize the physical design from the point of view of meeting setup time, Phase 4A addresses hold time violations. FIG. 24 shows flow diagram 2400, which illustrates a buffer insertion technique for addressing hold time violations. Hold time violations usually result from clock skews or phase differences between common or related clocks. As a result of a hold time violation, a new signal transition may arrive at a state element before the previous signal can be latched. To avoid a hold time violation, the process of flow diagram 2400 inserts one or more buffers to lengthen the signal path. The process of flow diagram 2400 begins at step 2401 with a timing-annotated netlist that is cluster partitioned. The clusters in the netlist are examined one by one. Within each cluster, STA 308 is called to identify one by one signal paths with a hold time violation (steps 2402–2404). In a path identified with a hold time violation, the amount H indicating the extent of the hold time violation is calculated (step 2406). From this value H, an equivalent number N of basic driver delays is calculated, (step 2407). A basic driver delay is the delay of the smallest driver in the cell library. The end point $P_t$ of the signal path having the hold time violation is then identified (step 2408). ($P_t$ is an input terminal to a state element.) N serially connected basic buffers are then inserted between $P_t$ and the input terminal of the state element at the end of the signal path. Timing is then recomputed for the cluster (step 2411). The process then returns to step 2404 to process the next signal path with a hold time violation. Phase 4A completes when all paths with hold time violations in all clusters are processed.

Figure 25:
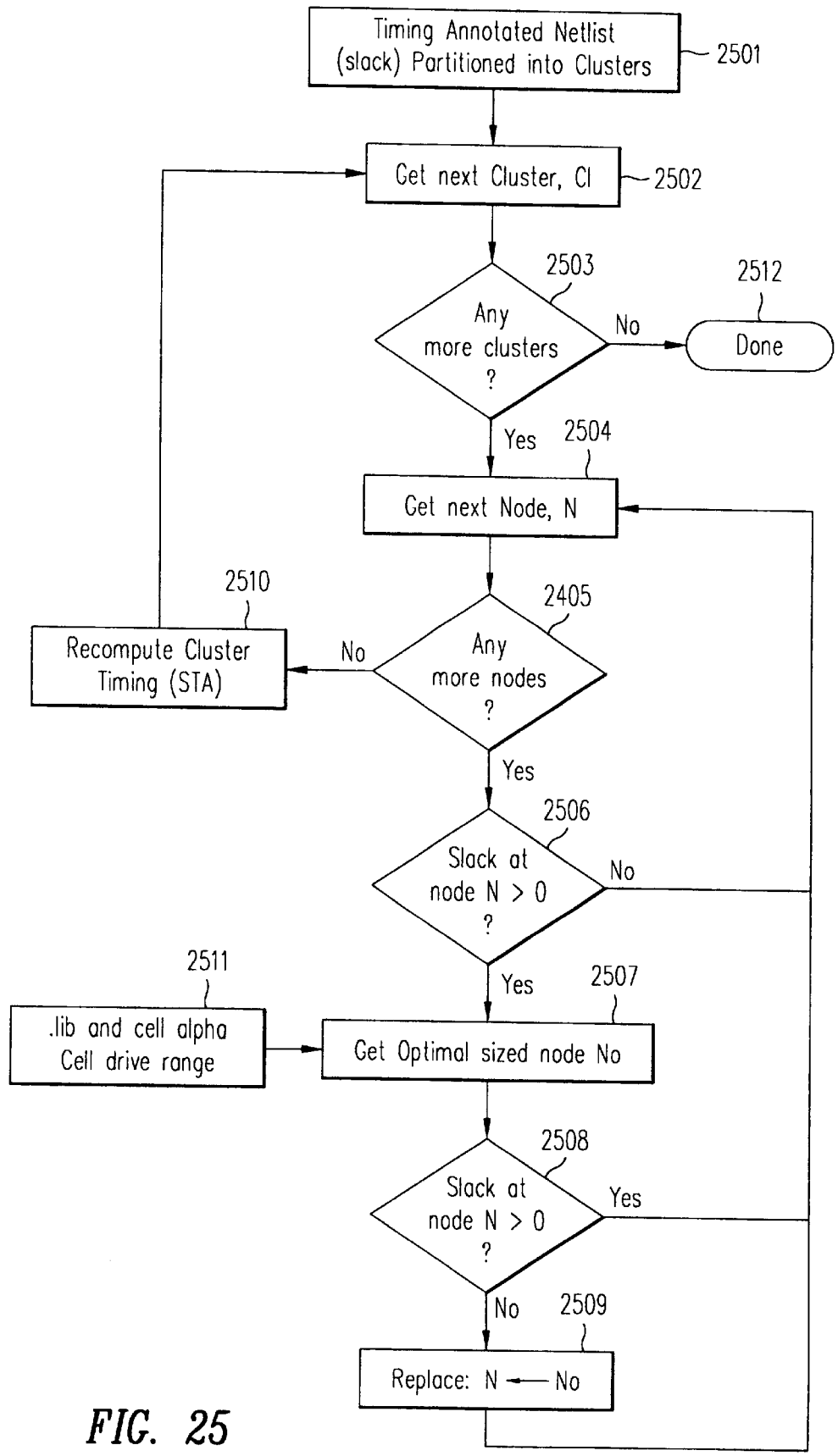
FIG. 25 shows flow diagram 2500 which illustrates a process for reducing overall silicon area

At Phase 4B, each cell instance is with positive slack is examined to ensure that the required silicon area is reduced. A process for implementing Phase 4B is illustrated in FIG. 25 by flow diagram 2500. The process of flow diagram 2500 begins at step 2501 with a timing annotated netlist that is partitioned into clusters. The process of flow diagram 2500 traverses the netlist cluster by cluster and, within each cluster computes PI for each cell instance, traversing from the output terminals of the cluster (steps 2503–2505. Each Node with a positive slack is examine to determine if the output load is within the operating range of the Node, by identifying the cell $N_o$ whose optimal operating range (e.g., using an α that favors area over speed) encompasses the output load (step 2506–2508). If the current Node is not optimal, the current Node is replaced by an instance of No (step 2509). The process then returns to step 2504 for the next Node, until all Nodes in the cluster are traversed.

Timing for the cluster is recomputed after traversal of all Nodes in a cluster (step 2510). Phase 4B completes after all clusters in the netlist are traversed (step 2512)

The above detailed description is provided to illustrate specific embodiments of the present invention and is not intended to be limiting of the present invention. Numerous modification and variations within the scope of the present invention are possible. The present invention is set forth in the following claims.

We claim:

1. A method for post-layout optimization of an integrated circuit, comprising:

providing a logic description of said integrated circuit;

synthesizing, from said logic description, a netlist of said integrated circuit including instances from a standard cell design library;

placing and routing said instances to provide a physical design of said integrated circuit;

extracting, from said physical design, models of parasitic impedance of interconnect in said physical design; and optimizing said physical design by modifying said physical design according to said models of parasitic impedance.

2. A method as in claim 1, wherein said optimizing comprises:

identifying, using a static timing analyzer, locations in said physical design where timing violations occur; and when a timing violation is identified:

(a) applying one or more local transformations to said physical design to correct said timing violation; and (b) returning to said identifying.

3. A method as in claim 2, wherein said static timing analyzer computes a slack for each terminal of said physical design.

4. A method as in claim 3, wherein, to compute said slack, both a forward sweep and a backward sweep of said physical design are performed.

5. A method as in claim 4, wherein said backward sweep computes a required signal arrival time.

6. A method as in claim 4, wherein said forward sweep computes a latest signal arrival time.

7. A method as in claim 2, wherein said local transformation comprises replacing an instance of a first standard cell in said physical design by an instance of a second standard cell within the function group of said first standard cell, and wherein said second instance is selected on the basis of its operating range of loads.

8. A method as in claim 2, wherein said identifying step identifies instances at which a driver mismatches with an output load.

9. A method as in claim 2, wherein said identifying step ranks instances according to a descending order of potential timing improvement.

10. A method as in claim 2, wherein said local transformation comprises node off-loading.

11. A method as in claim 2, wherein said local transformation corrects a hold time violation.

12. A method as in claim 2, wherein said local transformation identifies instances along a critical, path.

13. A method as in claim 2, wherein said local transformation is performed only when a resulting timing improvement exceeds a predetermined threshold.

14. A method as in claim 4, wherein said identifying comprises:

computing, for each of said instances, a potential improvement value;

during said forward sweep, based on said potential improvement value, computing for each terminal of each instance a forward priority value; and during said backward sweep, based on said potential improvement value, computing for each terminal of each instance a backward priority value; and computing, for each terminal of each instance, an equivalent priority value based on said forward and backward priority values.

15. A method as in claim 4, wherein said forward sweep begins at primary input terminals of said physical design and propagates said slack towards primary output terminals of said physical design.

16. A method as in claim 4, wherein said backward sweep begins at primary output terminals of said physical design and propagates said slack towards said primary input terminals of said physical design.

17. A method as in claim 1, further comprising analyzing said standard cell library to provide, for each output driver in said standard cell library, an operating range of loads for which said output driver can optimally drive.

18. A method as in claim 17, wherein said analyzing step includes applying a metric for trading-off speed performance for silicon area.

19. A method as in claim 18 wherein said metric comprises a ratio between change of silicon area and change of speed performance.

20. A method as in claim 17, wherein said analyzing step comprises grouping standard cells in said standard cell library into function groups, each function group consisting of logically equivalent members made up of standard cells in said standard cell library.

21. A method as in claim 1, wherein said models of parasitic impedance are obtained using an asymptotic waveform evaluation technique.

22. A method as in claim 1, further comprising a clock tree analysis.

23. A method as in claim 1, wherein said models of parasitic impedance comprise a $\pi$-model.

24. A method as in claim 23, further comprising computing, from said p-model, an effective load capacitor.

25. A method as in claim 24, further comprising computing, from said p-model and said effective load capacitor, an input transition time at an input terminal of a cell instance.

26. A method for post-layout optimization of a physical design of a circuit, comprising:

extracting, from said physical design, parasitic models of interconnect in said physical design;

applying a plurality of optimization steps, each of said optimization steps transforming said physical design to achieve a desired performance based on area or delay, said optimization steps being applied in order of potential intrusiveness to said physical design.

27. A method as in claim 26, wherein one of said optimization steps comprises:

identifying, in said physical design, a cell instance mismatched to an output load driven by said cell instance; and replacing said cell instance by a second cell instance matched to said output load.

28. A method as in claim 26, wherein one of said optimization steps comprises:

computing a potential improvement in slack for each cell instance in said physical design;

selecting, from said physical design, cell instances having potential improvement in slack exceeding a predetermined value; and applying transformations to said selected cell instances to achieve said potential improvement in slack.

29. A method as in claim 28, wherein said selecting further comprises:
performing a forward sweep of said physical design to provide for each cell instance a forward priority value;
performing a backward sweep of said physical design to provide for each cell instance a backward priority value;
calculating for each cell instance an equivalent priority value based on a corresponding forward priority value and a corresponding backward priority value; and
ranking cell instances in said physical design according to said equivalent priority value.

30. A method as in claim 28, wherein said transformation comprises one or more of cell instance downsizing, cell instance upsizing, and node off-loading.

31. A method as in claim 26, wherein one of said optimization steps selects circuits in said physical design for optimization according to a metric based on a path-based algorithm.

32. A method as in claim 31, wherein said circuits are selected using a critical path algorithm.

33. A method as in claim 31, wherein said one of said optimization steps applies one of cell instance downsizing, cell instance upsizing, node off-loading, cell instance input-swapping, and logic duplication.

34. A method as in claim 26, wherein one of said optimization steps provides a transformation of said physical design to ensure said physical design meet hold time requirements.

35. A method as in claim 34, wherein said transformation comprises inserting buffers to increase signal arrival time at a state element.

36. A method as in claim 26, wherein each optimization step invokes a timing analyzer for computing a slack value at a terminal of a cell instance or an interconnect.

37. A method as in claim 36, wherein said timing analyzer comprises a static timing analyzer.

38. A method as in claim 37, wherein said static timing analyzer performs incremental timing analysis.

39. A method as in claim 26, further comprising characterizing a standard cell library from which cell instances of said physical design were selected.

40. A method as in claim 39, said characterizing comprises assigning an operating range of output load to each cell in said standard cell library.

41. A method as in claim 40, wherein said operating range of output load being assigned based on a metric involving area and delay.

42. A method as in claim 41, further comprising, prior to said extracting step, generating said physical design using a layout directive that results in at least a predetermined percentage of said cell instances not meeting timing requirements, when computed under a wire load model.

43. A method as in claim 26, wherein the last of said optimization steps comprises:
identifying in said physical design a cell instance meeting timing requirements and mismatched to an output load driven by said cell instance; and
replacing said cell instance by a second cell instance matching said output load and having a smaller silicon area than the silicon area of said cell instance.

44. A method for selecting a cell from a library to perform a given logic function and to drive a given load capacitance, comprising:
dividing cells in said library into a plurality of groups, such that cells within each of said groups perform substantially the same logic function;
within each of said groups, assigning to each of selected ones of cells an operating range of loads;
selecting one of said groups by matching said given logic function to the logic function performed by cells in said selected group; and
selecting said cell from said selected group by matching said given load capacitance to said operating range of said cell.

45. A method as in claim 44, wherein said assigning step assigns said operating range of loads to a cell in said library according to a metric relating an area of said cell to a delay of said cell.

46. A method as in claim 45, wherein said metric compares two cells within one of said group according to a difference between the areas of said cells and a difference between delays in said cells.

47. A method as in claim 46, wherein said difference between the areas of said cells is normalized by a mean area of cells within the group of said two cells.

48. A method as in claim 46, wherein said difference between the delays of said cells is normalized by a mean delay of cells within the group of said two cells, under a zero-load condition.

49. A method as in claim 44, wherein each said group comprises:
a cell performing said logic function; and
a combination including a cell performing said logic function and a buffer.

50. A method as in claim 44, wherein each said group comprises:
a cell performing said logic function; and
a combination including a cell performing a logic function complement to said logic function and an inverter.

51. A method for identifying in a post-layout circuit a cell instance for optimization, comprising:
computing, for each cell instance in said post-layout circuit, a potential improvement value;
during a forward sweep of said post-layout circuit, based on said potential improvement value, computing for each terminal of each instance a forward priority value; and
during a backward sweep of said post-layout circuit, based on said potential improvement value, computing for each terminal of each instance a backward priority value;
computing, for each terminal of each instance, an equivalent priority value based on said forward and backward priority values; and
selecting among instances of said post-layout circuit the cell instance having the highest equivalent priority value.

52. A method as in claim 51, wherein said selecting step sorts instances in said post-layout circuit in descending order of equivalent priority value.

53. A method as in claim 51, wherein in said forward sweep, an output terminal of an instance in said circuit area receives a forward priority value substantially equal to the sum of forward priority values in input terminals of said instance.

54. A method as in claim 51, wherein in said forward sweep, at each divergence point on an interconnect encountered, each output branch of said divergence point receives a forward priority value substantially equal to a forward priority value of an input terminal of said interconnect.

55. A method as in claim 51, wherein at a merged point on an interconnect encountered in said forward sweep, each output terminal of said interconnect receives a forward priority value substantially equal to the sum of forward priority values in input terminals of said interconnect.

56. A method as in claim 51, wherein in said backward sweep, each input terminal of an instance in said circuit area receives a backward priority value substantially equal to a backward priority value in an output terminal of said instance.

57. A method as in claim 51, wherein in said backward sweep, at each divergence point on an interconnect encountered, each input branch of said divergence point receives a forward priority value substantially equal to a forward priority value of an output terminal of said interconnect.

58. A method as in claim 51, wherein at a merged point on an interconnect encountered in said backward sweep, each input terminal of said interconnect receives a backward priority value substantially equal to a backward priority value of an output terminal of said interconnect.

59. A method as in claim 51, wherein each of said equivalent priority values is used to compute a slack value.

60. A method as in claim 59, wherein said slack value is provided by interpolation procedure using a table of said equivalent priority values according to the size of an output load of said selected instance.

* * * * *